United States Patent
Wang et al.

(10) Patent No.: US 11,277,246 B2
(45) Date of Patent: Mar. 15, 2022

(54) BASE STATION, USER EQUIPMENT AND WIRELESS COMMUNICATION METHOD

(71) Applicant: Panasonic Intellectual Property Corporation of America, Torrance, CA (US)

(72) Inventors: Lilei Wang, Beijing (CN); Hidetoshi Suzuki, Kanagawa (JP); Quan Kuang, Frankfurt (DE)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 92 days.

(21) Appl. No.: 16/652,680

(22) PCT Filed: Nov. 17, 2017

(86) PCT No.: PCT/CN2017/111537
§ 371 (c)(1),
(2) Date: Apr. 1, 2020

(87) PCT Pub. No.: WO2019/095256
PCT Pub. Date: May 23, 2019

(65) Prior Publication Data
US 2020/0244420 A1    Jul. 30, 2020

(51) Int. Cl.
*H04L 5/00* (2006.01)
*H04W 72/04* (2009.01)
*H04W 72/12* (2009.01)

(52) U.S. Cl.
CPC ............ *H04L 5/0053* (2013.01); *H04L 5/001* (2013.01); *H04L 5/0044* (2013.01);
(Continued)

(58) Field of Classification Search
CPC ..... H04L 5/001; H04L 5/0044; H04L 5/0053; H04L 5/0094; H04W 72/04;
(Continued)

(56) References Cited

U.S. PATENT DOCUMENTS 7,808,949 B2 * 10/2010 Seo ................. H04L 5/0007
370/329
8,179,849 B2 * 5/2012 Callard ............. H03M 13/271
370/329
(Continued)

FOREIGN PATENT DOCUMENTS

AT     545257 T  *  2/2012  .......... H04L 5/0007
CA    2711319 A1 *  7/2009  .............. H04B 7/12
(Continued)

OTHER PUBLICATIONS

US 8,274,990 B2, 09/2012, Seo et al. (withdrawn)
(Continued)

*Primary Examiner* — Eric Nowlin
(74) *Attorney, Agent, or Firm* — Seed IP Law Group LLP

(57) ABSTRACT

Provided are a base station, user equipment and wireless communication methods related to resource allocation of PDSCH/PUSCH in NR. A base station comprises: circuitry operative to allocate Physical Resource Blocks (PRBs) for data transmission based on one of a set of resource allocations; and a transmitter operative to transmit data on the PRBs to a user equipment, wherein the set of resource allocations comprises: a first resource allocation of interleaving Virtual Resource Blocks (VRBs) consecutively numbered and mapping the interleaved VRBs to the PRBs consecutive in frequency domain.

14 Claims, 20 Drawing Sheets

(52) U.S. Cl.
CPC ......... *H04L 5/0094* (2013.01); *H04W 72/042* (2013.01); *H04W 72/0453* (2013.01); *H04W 72/1263* (2013.01)

(58) Field of Classification Search
CPC ............. H04W 72/042; H04W 72/044; H04W 72/0446; H04W 72/0453; H04W 72/1263
See application file for complete search history.

(56) References Cited

U.S. PATENT DOCUMENTS

| | | | | |
|---|---|---|---|---|
| 8,526,371 | B2 * | 9/2013 | Malladi | H04L 5/0023 370/329 |
| 8,599,775 | B2 * | 12/2013 | Seo | H04L 5/0007 370/329 |
| 8,611,290 | B2 * | 12/2013 | Seo | H04L 1/0071 370/329 |
| 8,817,896 | B2 * | 8/2014 | Baker | H04L 5/0007 375/260 |
| 9,185,701 | B2 * | 11/2015 | Seo | H04L 5/0028 |
| 9,301,292 | B2 * | 3/2016 | Son | H04W 72/042 |
| 9,312,993 | B2 * | 4/2016 | Seo | H04W 72/0453 |
| 9,408,226 | B2 * | 8/2016 | Seo | H04W 72/1273 |
| 9,603,138 | B2 * | 3/2017 | Zhao | H04W 72/042 |
| 9,603,144 | B2 * | 3/2017 | Seo | H04L 5/0092 |
| 9,860,886 | B2 * | 1/2018 | Kim | H04L 5/0048 |
| 10,015,002 | B2 * | 7/2018 | Seo | H04W 24/08 |
| 10,244,528 | B2 * | 3/2019 | Seo | H04L 5/0007 |
| 10,505,680 | B2 * | 12/2019 | Marinier | H04L 5/001 |
| 10,644,860 | B2 * | 5/2020 | Seo | H04L 5/0053 |
| 10,869,304 | B2 * | 12/2020 | Li | H04W 48/16 |
| 10,952,211 | B2 * | 3/2021 | Nishio | H04L 1/0003 |
| RE48,603 | E * | 6/2021 | Baker | H04L 27/2602 |
| 11,064,498 | B2 * | 7/2021 | Wu | H04W 72/04 |
| 2009/0073929 | A1 * | 3/2009 | Malladi | H04L 5/0037 370/329 |
| 2009/0175230 | A1 * | 7/2009 | Callard | H04L 1/0071 370/329 |
| 2009/0175231 | A1 | 7/2009 | Seo et al. | |
| 2009/0310476 | A1 * | 12/2009 | Seo | H04L 1/0071 370/203 |
| 2010/0118998 | A1 * | 5/2010 | Baker | H04L 27/2602 375/260 |
| 2011/0044270 | A1 * | 2/2011 | Seo | H04L 5/0092 370/329 |
| 2011/0058526 | A1 * | 3/2011 | Seo | H04L 5/0007 370/329 |
| 2013/0010685 | A1 | 1/2013 | Kim et al. | |
| 2013/0039284 | A1 * | 2/2013 | Marinier | H04L 5/001 370/329 |
| 2013/0064099 | A1 | 3/2013 | Kim et al. | |
| 2013/0343363 | A1 * | 12/2013 | Seo | H04L 5/0044 370/336 |
| 2014/0146768 | A1 * | 5/2014 | Seo | H04W 72/0453 370/329 |
| 2014/0192759 | A1 * | 7/2014 | Son | H04W 72/0426 370/329 |
| 2015/0208390 | A1 * | 7/2015 | Zhao | H04W 72/042 370/330 |
| 2015/0208406 | A1 * | 7/2015 | Seo | H04L 5/0092 370/329 |
| 2016/0037493 | A1 * | 2/2016 | Kim | H04W 72/0446 370/329 |
| 2016/0037516 | A1 * | 2/2016 | Seo | H04L 5/0028 370/329 |
| 2016/0191226 | A1 * | 6/2016 | Seo | H04W 72/0453 370/241 |
| 2016/0234813 | A1 | 8/2016 | Kim et al. | |
| 2017/0142719 | A1 * | 5/2017 | Seo | H04L 5/0092 |
| 2017/0332398 | A1 * | 11/2017 | Seo | H04W 72/1268 |
| 2018/0323945 | A1 * | 11/2018 | Seo | H04L 5/0053 |
| 2019/0082430 | A1 * | 3/2019 | Li | H04W 72/04 |
| 2019/0150118 | A1 * | 5/2019 | Nam | H04L 5/0094 370/329 |
| 2019/0208482 | A1 * | 7/2019 | Tooher | H04L 5/005 |
| 2019/0349943 | A1 * | 11/2019 | Wu | H04W 72/0453 |
| 2020/0068610 | A1 * | 2/2020 | Li | H04L 5/001 |
| 2020/0083994 | A1 * | 3/2020 | Marinier | H04L 5/001 |
| 2020/0084771 | A1 * | 3/2020 | Nishio | H04L 1/0071 |
| 2020/0137745 | A1 * | 4/2020 | Bachu | H04L 69/321 |
| 2020/0221463 | A1 * | 7/2020 | Wang | H04W 72/0493 |
| 2020/0244420 | A1 * | 7/2020 | Wang | H04W 72/1263 |
| 2020/0244426 | A1 * | 7/2020 | Seo | H04L 5/0053 |
| 2020/0344758 | A1 * | 10/2020 | Li | H04L 5/0064 |
| 2021/0298056 | A1 * | 9/2021 | Fu | H04W 72/1289 |

FOREIGN PATENT DOCUMENTS

| | | | | |
|---|---|---|---|---|
| CA | 2711319 | C * | 8/2013 | ........... H04L 5/0044 |
| CN | 101675636 | A * | 3/2010 | ........... H04L 5/0044 |
| CN | 101911745 | A * | 12/2010 | ........... H04L 5/0039 |
| CN | 102870355 | | 1/2013 | |
| CN | 101911745 | B * | 7/2013 | ........... H04L 5/0039 |
| CN | 103326846 | | 9/2013 | |
| CN | 103326846 | A * | 9/2013 | ........... H04L 5/0028 |
| CN | 101675636 | B * | 10/2013 | ........... H04L 5/0044 |
| CN | 103326846 | B * | 7/2015 | ............... H04B 7/12 |
| CN | 105122753 | A * | 12/2015 | ........ H04W 72/0446 |
| CN | 105122753 | B * | 11/2018 | ........ H04W 72/0446 |
| CN | 109803412 | B * | 1/2021 | ........... H04W 72/042 |
| CN | 112888073 | A * | 6/2021 | ........... H04W 72/0453 |
| EP | 2077650 | A2 * | 7/2009 | ........... H04L 5/0039 |
| EP | 2153602 | B1 * | 2/2012 | ......... H04L 27/2602 |
| EP | 2077650 | A3 * | 9/2012 | ........... H04L 5/0044 |
| EP | 2077650 | B1 * | 6/2018 | ........... H04L 5/0092 |
| EP | 3379762 | A2 * | 9/2018 | ........ H04W 72/0446 |
| EP | 3379762 | A3 * | 1/2019 | ........... H04L 5/0028 |
| EP | 3697153 | A1 * | 8/2020 | ........ H04W 72/0453 |
| EP | 3697153 | A4 * | 11/2020 | ........ H04W 72/0453 |
| ES | 2381638 | T3 * | 5/2012 | ........... H04L 5/0032 |
| JP | 2011-504322 | A | 2/2011 | |
| JP | 4910068 | B2 * | 4/2012 | ........... H04L 5/0032 |
| JP | 5048844 | B2 * | 10/2012 | ........... H04L 5/0039 |
| JP | 2013-534072 | A | 8/2013 | |
| JP | 2021-502760 | A | 1/2021 | |
| KR | 100925441 | B1 * | 11/2009 | ........... H04L 5/0039 |
| KR | 20100017474 | A * | 2/2010 | ........... H04L 5/0032 |
| KR | 101469730 | B1 * | 12/2014 | ........... H04L 5/0032 |
| KR | 20200079548 | A * | 7/2020 | ........... H04L 5/0053 |
| WO | WO-2008135911 | A1 * | 11/2008 | ........... H04L 5/0044 |
| WO | WO-2009088202 | A2 * | 7/2009 | ........... H04L 5/0028 |
| WO | WO-2009088202 | A3 * | 10/2009 | ........... H04L 5/0041 |
| WO | WO-2009120827 | A1 * | 10/2009 | ......... H04L 27/2601 |
| WO | WO-2014171758 | A1 * | 10/2014 | ........... H04W 72/042 |
| WO | 2016/169046 | | 10/2016 | |
| WO | 2019/094796 | A1 | 5/2019 | |

OTHER PUBLICATIONS

Qualcomm Incorporated, Discussion on VRB-to-PRB mapping and TB size determination, Sep. 18, 2017, 3GPP TSG RAN WG1 NR Adhoc#3, Tdoc: R1-1716428 (Year: 2017).*

Vivo, Summary of Offline Discussions on DL PRB Bundling, Oct. 9, 2017, 3GPP TSG RAN WG1 #90b, Tdoc: R1-1719072 (Year: 2017).*

Huawei et al., On uplink hopping and DVRB, Nov. 27, 2017, 3GPP TSG RAN WG1 Meeting 91, Tdoc: R1-1719829 (Year: 2017).*

International Search Report of PCT application No. PCT/CN2017/111537 dated Aug. 8, 2018.

* cited by examiner

BASE STATION, USER EQUIPMENT AND WIRELESS COMMUNICATION METHOD

BACKGROUND

1. Technical Field

The present disclosure relates to the field of wireless communication, and in particular, to a base station (eNodeB), a user equipment (UE) and wireless communication methods related to resource allocation of Physical Downlink Shared Channel (PDSCH)/Physical Uplink Shared Channel (PUSCH) in NR (New Radio access technology).

2. Description of the Related Art

In LTE (Long Term Evolution), there are three resource allocation (RA) types for downlink (DL), that is, RA type 0, RA type 1 and RA type 2. The notion of a Virtual Resource Block (VRB) is introduced in LTE so that resource allocation may be represented as mapping from VRB pairs (or VRBs) to PRB pairs (PRBs).

RA type 0 is based on bitmap indication and the indicated granularity is RBG (Resource Block Group) size. A RBG may be composed of one or more Physical Resource Blocks (PRBs) and the RBG size may be indicated by the number of PRBs included in one RBG. Thus, RBG size could be 1, 2, 3 or 4 PRBs based on different bandwidth. For RA type 0, the mapping from VRBs to PRBs is one-to-one, kind of direct mapping.

RA type 1 is also based on direct mapping between VRBs and PRBs and bitmap indication. The difference from RA type 0 is that some bits are used to indicate which subset of the RBG is addressed, and a shift in the position of the bitmap.

RA type 2 in LTE is further subdivided into RA type 2 with localized allocation and RA type 2 with distributed allocation. For RA type 2 with localized allocation, the signaling of resource allocation is different from those of RA type 0/1 and it uses a starting position indication and allocated size to save the signalling. But the mapping is still directly from VRBs to PRBs.

For RA type 2 with distributed allocation, the mapping from VRBs to PRBs is not direct. The target is to span the consecutive VRBs to the whole bandwidth as much as possible to realize frequency diversity. To reach such purpose, there are basically two steps. The first step is to use interleaving function to distribute consecutive VRB pairs into distributed VRB pairs. The second step is to further split two slots of one PRB pair in frequency domain with certain gap.

Since the above three resource allocation types for DL in LTE are well known by those skilled in the art, no more further details thereof is discussed herein. In NR/5G, resource allocation for PDSCH/PUSCH is still under discussion until now.

SUMMARY

One non-limiting and exemplary embodiment facilitates resource allocation of PDSCH/PUSCH in NR to keep codeblock level diversity equalized.

In a first general aspect of the present disclosure, there is provided a base station, comprising: circuitry operative to allocate Physical Resource Blocks (PRBs) for data transmission based on one of a set of resource allocations; and a transmitter operative to transmit data on the PRBs to a user equipment, wherein the set of resource allocations comprises: a first resource allocation of interleaving Virtual Resource Blocks (VRBs) consecutively numbered and mapping the interleaved VRBs to the PRBs consecutive in frequency domain.

In a second general aspect of the present disclosure, there is provided a user equipment, comprising: a receiver operative to receive data transmitted on Physical Resource Blocks (PRBs) and resource allocation information from a base station; and circuitry operative to decode the data based on the resource allocation information, wherein the resource allocation information indicates on which one of a set of resource allocations the PRBs are allocated for data transmission based, and wherein the set of resource allocations comprises: a first resource allocation of interleaving Virtual Resource Blocks (VRBs) consecutively numbered and mapping the interleaved VRBs to the PRBs consecutive in frequency domain.

In a third general aspect of the present disclosure, there is provided a user equipment, comprising: a receiver operative to receive resource allocation information from a base station; circuitry operative to allocate Physical Resource Blocks (PRBs) for data transmission based on the resource allocation information; and a transmitter operative to transmit data on the PRBs to the base station, wherein the resource allocation information indicates on which one of a set of resource allocations the PRBs are allocated for data transmission based, and wherein the set of resource allocations comprises: a fourth resource allocation of interleaving Virtual Resource Blocks (VRBs) consecutively numbered and mapping the interleaved VRBs to the PRBs consecutive in frequency domain.

In a fourth general aspect of the present disclosure, there is provided a base station, comprising: a transmitter operative to transmit resource allocation information to a user equipment; a receiver operative to receive data transmitted on Physical Resource Blocks (PRBs), which are allocated based on the resource allocation information, from the user equipment; and circuitry operative to decode the data, wherein the resource allocation information indicates on which one of a set of resource allocations the PRBs are allocated for data transmission based, and wherein the set of resource allocations comprises: a fourth resource allocation of interleaving Virtual Resource Blocks (VRBs) consecutively numbered and mapping the interleaved VRBs to the PRBs consecutive in frequency domain.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
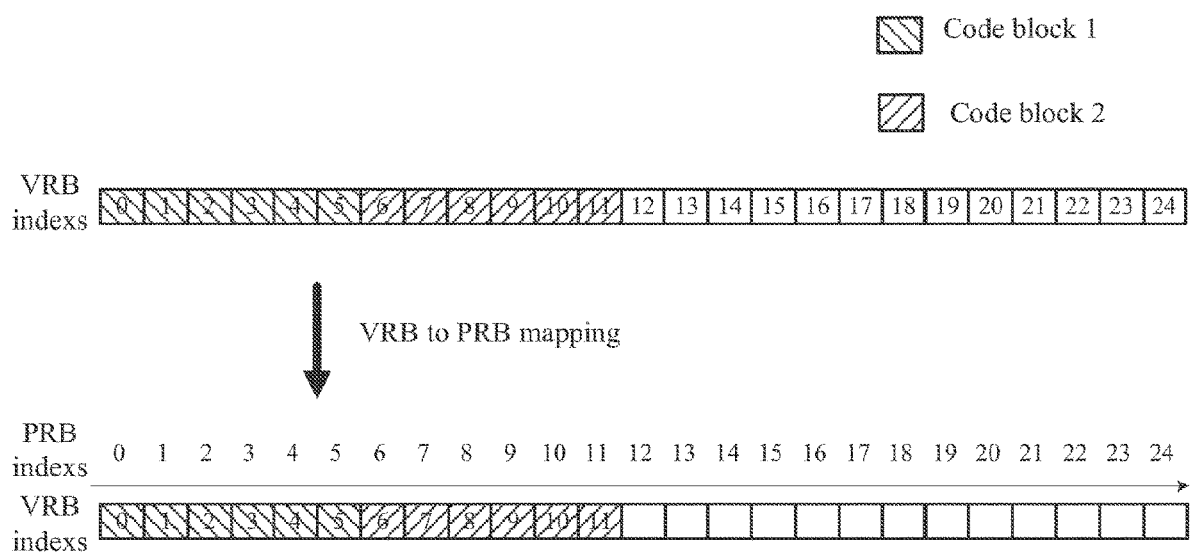
FIG. 1 schematically shows potentially unequal frequency diversity performance between code blocks due to direct mapping from VBRs to PRBs in NR.

In the following detailed description, reference is made to the accompanying drawings, which form a part thereof. In the drawings, similar symbols typically identify similar components, unless context dictates otherwise. It will be readily understood that the aspects of the present disclosure can be arranged, substituted, combined, and designed in a wide variety of different configurations, all of which are explicitly contemplated and make part of this disclosure.

In NR, two RA types for DL were agreed. One is RA type 0, which is same as RA type 0 in LTE and is also based on bitmap indication. The other is RA type 1, which is same as RA type 2 in LTE and is also subdivided into RA type 1 with localized allocation and RA type 1 with distributed allocation. Here, in order to distinguish these two types from the three types in LTE, RA type 0 in NR is referred to as NR RA type 0, and RA type 1 in NR is referred to as NR RA type 1.

The problem for NR resource allocation (especially for NR RA type 0 and NR RA type 1 with localized (consecutive) allocation) is that different code blocks within a Transmission Block (TB) may have unequal diversity performance as different code blocks are allocated in different frequencies. FIG. 1 schematically shows potentially unequal frequency diversity performance between code blocks due to direct mapping from VBRs to PRBs in NR. In the upper portion of FIG. 1, each box represents a VRB and the number (i.e. index) thereof is indicated in the box. In the lower portion of FIG. 1, each box represents a PRB and the number (i.e. index) thereof is indicated above the box along the thin arrow. The number in each box representing a PRB indicates the number (i.e. index) of VRB mapped thereto. It is assumed that the entire carrier bandwidth is 25 PRBs.

As shown in the upper portion of FIG. 1, consecutive 6 VRBs numbered in 0, 1, 2, 3, 4, 5 (i.e. with indexes 0, 1, 2, 3, 4, 5) are used for code block 1, as indicated by boxes filled with left slashes, while consecutive 6 VRBs numbered in 6, 7, 8, 9, 10, 11 (i.e. with indexes 6, 7, 8, 9, 10, 11) are used for code block 2, as indicated by boxes filled with right slashes. When it is assumed to employ direct mapping from VRBs to PRBs as employed for RA type 0 and RA type 1 with localized allocation in LTE, VRBs numbered in 0, 1, 2, 3, 4, 5, 6, 7, 8, 9, 10, 11 are respectively mapped to PRBs numbered in 0, 1, 2, 3, 4, 5, 6, 7, 8, 9, 10, 11, as shown in the lower portion of FIG. 1. That is to say, there is one-to-one mapping between a VRB and a PRB with a same index.

In this case, code block 1 and code block 2 are respectively allocated in different frequencies. It is possible that some code blocks (like code block 1 in FIG. 1) may have good frequency diversity but other code blocks (like code block 2 in FIG. 1) may have bad frequency diversity. This problem also exists in uplink resource allocation, which only has hopping mechanism to realize frequency diversity.

Figure 2:
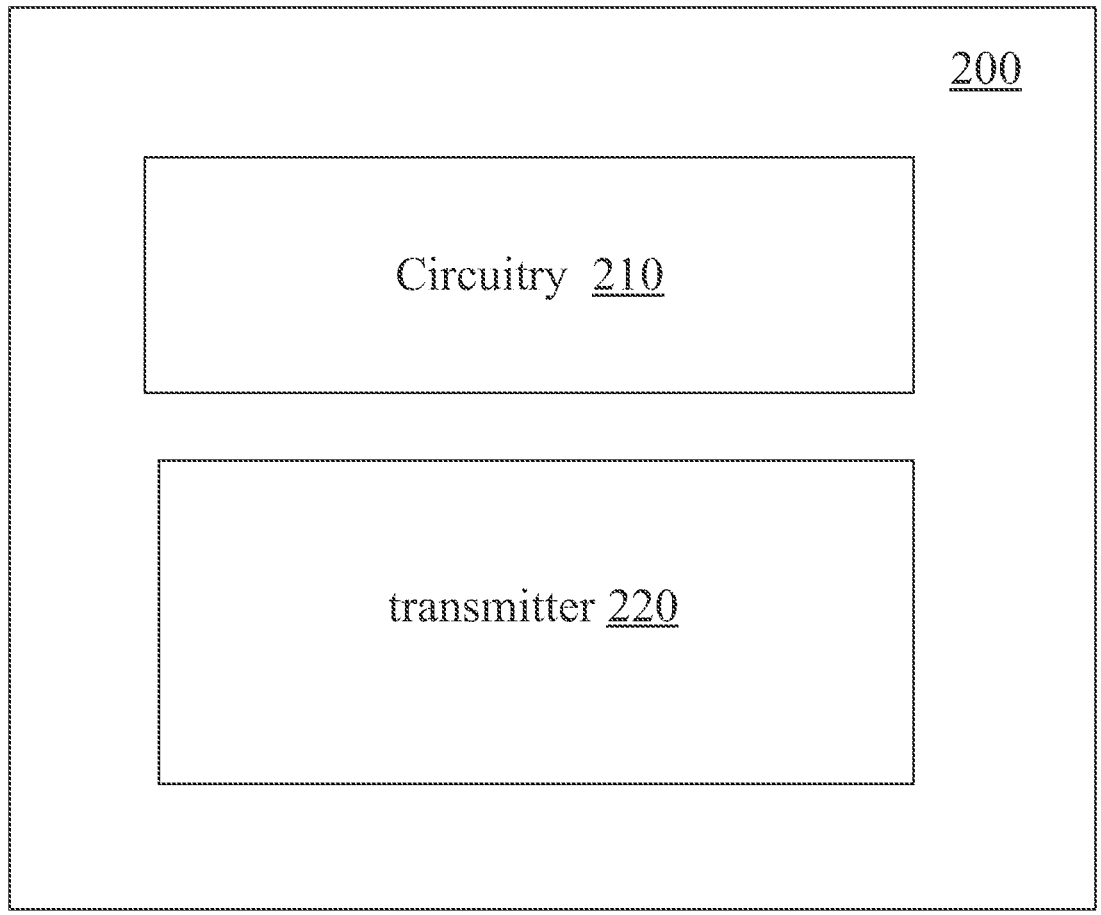
FIG. 2 illustrates a block diagram of a part of a base station according to an embodiment of the present disclosure.

In view of the above, in an embodiment of the present disclosure, there is provided a base station as shown in FIG. 2. FIG. 2 illustrates a block diagram of a part of a base station 200 according to an embodiment of the present disclosure. As shown in FIG. 2, the BS 200 may include circuitry 210 and a transmitter 220. The circuitry 210 is operative to allocate Physical Resource Blocks (PRBs) for data transmission based on one of a set of resource allocations. The transmitter 220 is operative to transmit data on the PRBs to a user equipment. The set of resource allocations comprises: a first resource allocation of interleaving Virtual Resource Blocks (VRBs) consecutively numbered and mapping the interleaved VRBs to the PRBs consecutive in frequency domain.

In order to facilitate understanding, NR RA type 1 with localized allocation is taken as an example of the first resource allocation here. Specifically, FIG. 3 schematically shows an example of mapping from VRBs to PRBs for NR RA type 1 with localized allocation according to an embodiment of the present disclosure.

Figure 3:
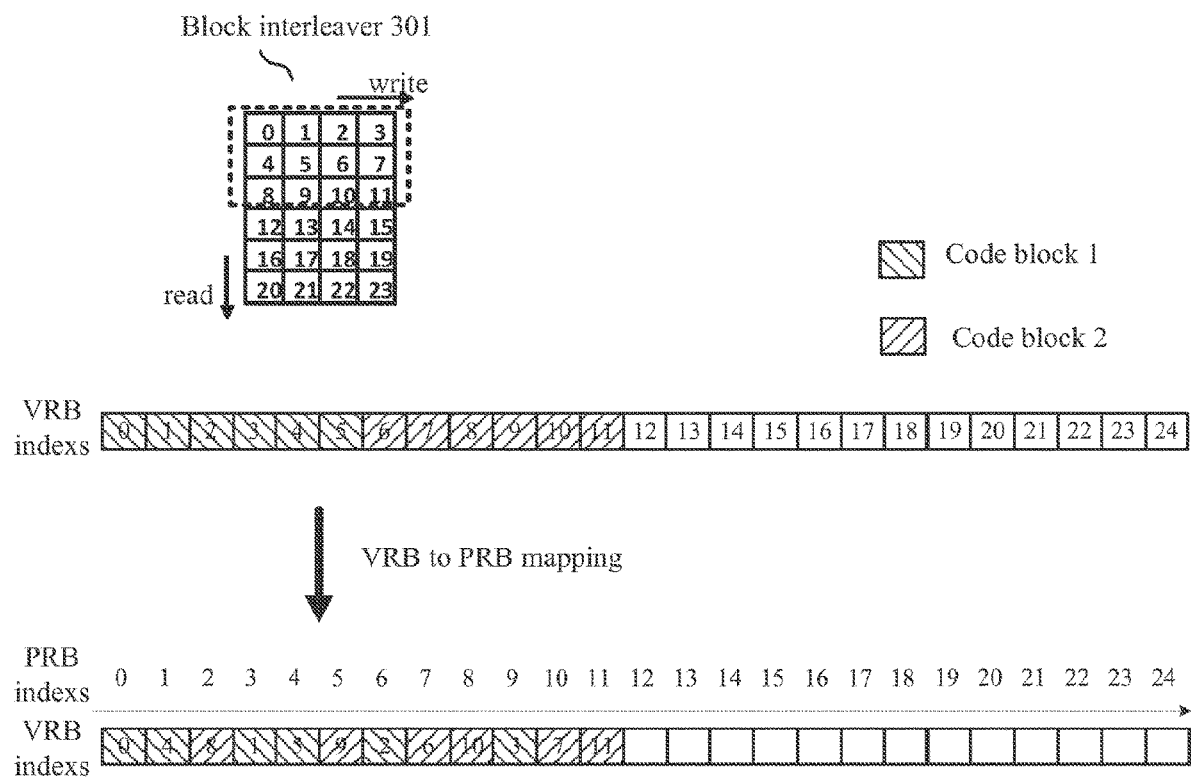
FIG. 3 schematically shows an example of mapping from VRBs to PRBs for NR RA type 1 with localized allocation according to an embodiment of the present disclosure.

Similarly with FIG. 1, in the upper portion of FIG. 3, each box represents a VRB and the number (i.e. index) thereof is indicated in the box. In the lower portion of FIG. 3, each box represents a PRB and the number (i.e. index) thereof is indicated above the box along the thin arrow. The number in each box representing a PRB indicates the number (i.e. index) of VRB mapped thereto. It is assumed that the entire carrier bandwidth is 25 PRBs. As shown in the upper portion of FIG. 3, consecutive 6 VRBs numbered in 0, 1, 2, 3, 4, 5 (i.e. with indexes 0, 1, 2, 3, 4, 5) are used for code block 1, as indicated by boxes filled with left slashes, while consecutive 6 VRBs numbered in 6, 7, 8, 9, 10, 11 (i.e. with indexes 6, 7, 8, 9, 10, 11) are used for code block 2, as indicated by boxes filled with right slashes.

Different from FIG. 1, interleaving is applied within the two code blocks instead of direct mapping from VRBs to PRBs in FIG. 3. For example, a block interleaver 301, that is, a rectangular matrix of 6 rows and 4 columns, is shown at left top corner of FIG. 3. In this example, the top 3 rows of the block interleaver 301, indicated by dashed lines in FIG. 3, may be used by the circuitry 210 to perform interleaving among consecutive 12 VRBs numbered in 0, 1, 2, 3, 4, 5, 6, 7, 8, 9, 10, 11. More details of the block interleaver 301 will be discussed later. Then, these 12 VRBs interleaved will be mapped to 12 consecutive PRBs, that is, 12 PRBs consecutive in frequency domain. As shown in the lower portion of FIG. 3, VRBs numbered in 0, 4, 8, 1, 5, 9, 2, 6, 10, 3, 7, 11 are respectively mapped to PRBs numbered in 0, 1, 2, 3, 4, 5, 6, 7, 8, 9, 10, 11.

Thus, VRBs numbered in 0, 1, 2, 3, 4, 5 used for code block 1 are distributed in inconsecutive frequencies by interleaving, as indicated by boxes filled with left slashes in the lower portion of FIG. 3. Also, VRBs numbered in 6, 7, 8, 9, 10, 11 used for code block 2 are distributed in inconsecutive frequencies by interleaving, as indicated by boxes filled with right slashes in the lower portion of FIG. 3. For code blocks 1 and 2, the allocated PRBs are distributed as much as possible within assigned bandwidth.

Compared with RA type 2 with localized allocation in LTE, since interleaving is applied within these two code blocks, diversity gain is equalized between these two code blocks. In addition, since interleaving is applied only within these two code blocks instead of the entire bandwidth, that is, interleaving is performed on assigned VRBs, the frequency position as a whole where they are mapped will not change. Thus, other VRBs numbered in 12, 13, 14, 15, 16, 17, 18, 19, 20, 21, 22, 23, 24, as indicated by blank boxes, will not be impacted by interleaving within the code blocks 1 and 2. These blank VRBs may be used for any other code blocks and may also be interleaved inside them independently.

Furthermore, the signaling of NR RA type 1 with localized allocation may be the same as that of RA type 2 with localized allocation in LTE, that is, may use a starting position indication and allocated size. Thereby, there is no impact on the scheduling gain.

According to an embodiment of the present disclosure, the set of resource allocations may further comprise a second resource allocation of interleaving VRBs consecutively numbered and mapping the interleaved VRBs to the PRBs the positions of which in frequency domain are indicated by a bitmap.

In order to facilitate understanding, NR RA type 0 is taken as an example of the second resource allocation here. Specifically, FIG. 4 schematically shows an example of mapping from VRBs to PRBs for NR RA type 0 according to an embodiment of the present disclosure.

Here, different from FIG. 3, the operation of the circuitry 210 is subdivided into two steps: VRB interleaving and mapping from VRB to PRB, for ease of illustration. In FIG. 4, the upper portion shows the original arrangement of VRBs assigned for code blocks 1 and 2. That is, consecutive 6 VRBs numbered in 0, 1, 2, 3, 4, 5 (i.e. with indexes 0, 1, 2, 3, 4, 5) are used for code block 1, as indicated by boxes filled with left slashes, while consecutive 6 VRBs numbered in 6, 7, 8, 9, 10, 11 (i.e. with indexes 6, 7, 8, 9, 10, 11) are used for code block 2, as indicated by boxes filled with right slashes.

Figure 4:
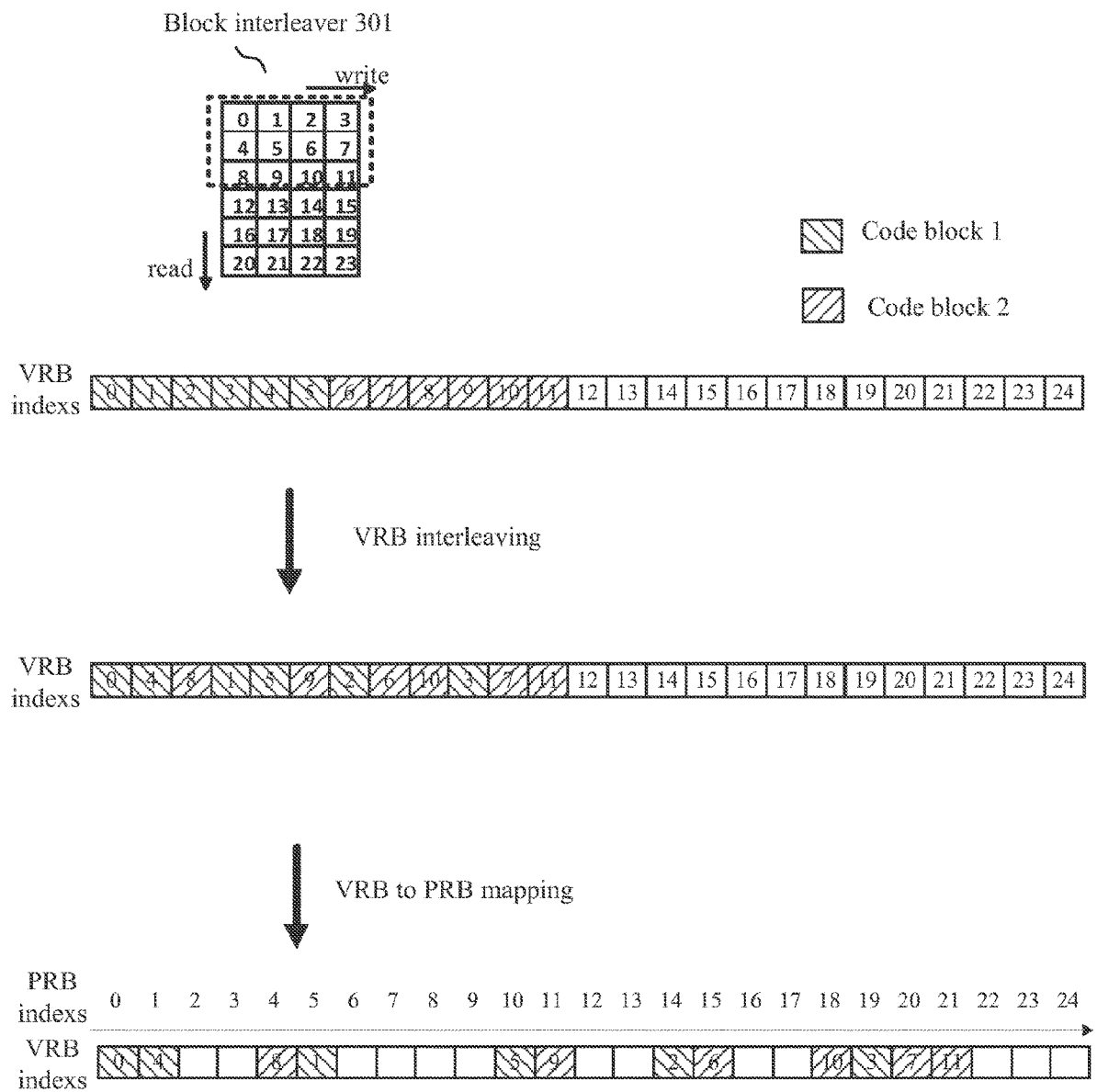
FIG. 4 schematically shows an example of mapping from VRBs to PRBs for NR RA type 0 according to an embodiment of the present disclosure.

The middle portion of FIG. 4 shows the arrangement of these VRBs after interleaving. For example, the same block interleaver 301 as that in FIG. 3 is used here, as shown at left top corner of FIG. 4.

Similarly with FIG. 1, in the upper portion and middle portion of FIG. 3, each box represents a VRB and the number (i.e. index) thereof is indicated in the box. In the lower portion of FIG. 3, each box represents a PRB and the number (i.e. index) thereof is indicated above the box along the thin arrow. The number in each box representing a PRB indicates the number (i.e. index) of VRB mapped thereto. It is also assumed that the entire carrier bandwidth is 25 PRBs. As shown at the left top corner of FIG. 4, the circuitry 210 may also use the top 3 rows of the block interleaver 301, indicated by dashed lines in FIG. 4, to perform interleaving among consecutive 12 VRBs numbered in 0, 1, 2, 3, 4, 5, 6, 7, 8, 9, 10, 11. As shown in the middle portion of FIG. 4, after VRB interleaving, these VRBs are arranged in an order of indexes 0, 4, 8, 1, 5, 9, 2, 6, 10, 3, 7, 11. More details of the block interleaver 301 will be discussed later.

Next, these 12 VRBs after interleaving will be mapped to 12 PRBs, as shown in the lower portion of FIG. 4. Different from FIG. 3 for NR RA type 1 with localized allocation, since allocated PRBs are indicated by bitmap, their position in frequency domain may be inconsecutive. For example, it is assumed that the bitmap is 101001010110 and the granularity of each bit of the bitmap is 2 PRBs, where "1" indicates that the corresponding 2 PRBs are allocated while "0" indicates that the corresponding 2 PRBs are not allocated. It can be derived from this bitmap that PRBs of indexes (numbers) 0, 1, 4, 5, 10, 11, 14, 15, 18, 19, 20, 21 are allocated for data transmission. Thus, VRBs numbered in 0, 4, 8, 1, 5, 9, 2, 6, 10, 3, 7, 11 are respectively mapped to PRBs numbered in 0, 1, 4, 5, 10, 11, 14, 15, 18, 19, 20, 21, as shown in the lower portion of FIG. 4.

It is noted that the only difference between NR RA type 0 and NR RA type 1 with localized allocation is the signaling of resource allocation. Specifically, as described above, NR RA type 0 uses bitmap to indicate resource allocation, like RA type 0 in LTE. NR RA type 1 with localized allocation use a starting position indication and allocated size, like RA type 2 with localized allocation in LTE, so that signaling can be saved compared with NR RA type 0. Thus, the above advantages obtained for NR RA type 1 with localized allocation can also obtained for NR RA type 0.

Specifically, compared with RA type 0 in LTE, since interleaving is applied within these two code blocks for NR RA type 0, diversity gain is equalized between these two code blocks. In addition, since interleaving is applied only within these two code blocks instead of the entire bandwidth, that is, interleaving is performed on assigned VRBs, the frequency position as a whole where they are mapped will not change. Furthermore, there is no impact on the scheduling gain.

It is noted that, the above specific bitmap example is only illustrative and the present disclosure is not limited thereto. For example, the bitmap may also indicate consecutive PRBs allocated for data transmission, for example, 111111111111.

According to an embodiment of the present disclosure, the set of resource allocations may further comprise a third resource allocation of interleaving VRBs consecutively numbered and mapping the interleaved VRBs to the PRBs inconsecutive in frequency domain within a specified or configured frequency range.

In order to facilitate understanding, NR RA type 1 with distributed allocation is taken as an example of the third resource allocation here. Specifically, FIG. 5 schematically shows an example of mapping from VRBs to PRBs for NR RA type 1 with distributed allocation according to an embodiment of the present disclosure.

Figure 5:
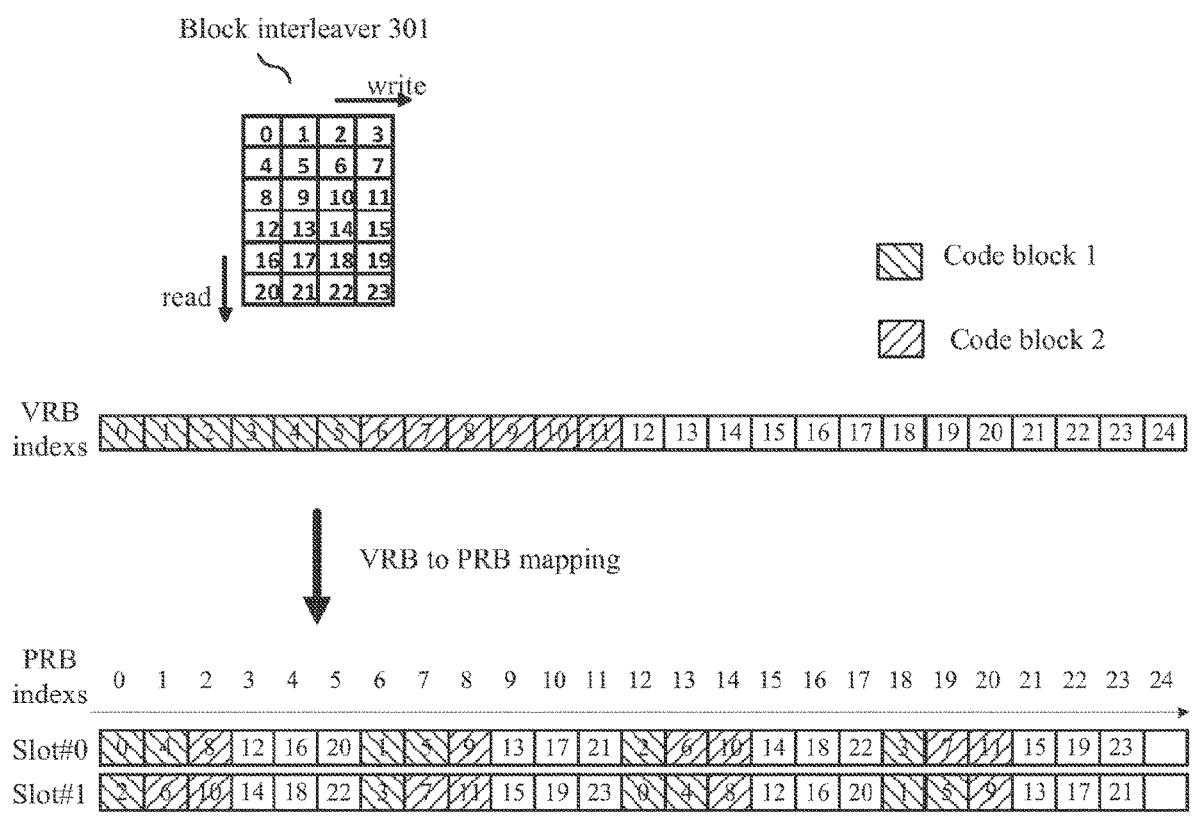
FIG. 5 schematically shows an example of mapping from VRBs to PRBs for NR RA type 1 with distributed allocation according to an embodiment of the present disclosure.

Similarly with FIGS. 3 and 4, the upper portion of FIG. 5 shows the original arrangement of VRBs assigned for code blocks 1 and 2. That is, consecutive 6 VRBs numbered in 0, 1, 2, 3, 4, 5 (i.e. with indexes 0, 1, 2, 3, 4, 5) are used for code block 1, as indicated by boxes filled with left slashes, while consecutive 6 VRBs numbered in 6, 7, 8, 9, 10, 11 (i.e. with indexes 6, 7, 8, 9, 10, 11) are used for code block 2, as indicated by boxes filled with right slashes. And, in the upper portion of FIG. 5, each box represents a VRB and the number (i.e. index) thereof is indicated in the box. It is also assumed that the entire carrier bandwidth is 25 PRBs.

As shown at the left top corner of FIG. 5, the block interleaver 301 is also used here. The difference from FIG. 3 (NR RA type 1 with localized allocation) and FIG. 4 (NR RA type 0) is that the entire block interleaver 301 (i.e. all 6 rows thereof) is used for NR RA type 1 k with distributed allocation. That is, not only these 12 VRBs used for code blocks 1 and 2 but also other VRBs of indexes 12, 13, 14, 15, 16, 17, 18, 19, 20, 21, 22, 23 are interleaved. As a result, as shown in the lower portion of FIG. 5, VRBs numbered in 0, 1, 2, 3, 4, 5, 6, 7, 8, 9, 10, 11 are respectively mapped to PRBs numbered in 0, 6, 12, 18, 1, 7, 13, 19, 2, 8, 14, 20 (as shown in the row of boxes indicated by slot #0). Details of two slots will be discussed later.

Thereby, the interleaving is based on almost entire system bandwidth so that it is tried to distribute the allocated VRBs into PRBs in the system bandwidth as much as possible, to get better frequency diversity performance, which is similar with RA type 2 with distributed allocation in LTE.

It is noted that the case that the interleaving is based on almost entire system bandwidth as shown in FIG. 5 is only for illustrative and the present disclosure is not limited thereto. The frequency range on which the interleaving is based may be the entire bandwidth or any subset of the entire bandwidth, which may be specified for example by standard or may be configured by any suitable signaling.

According to an embodiment of the present disclosure, after interleaving, the third allocation may further introduce a frequency gap on slot basis for each VRB.

Specifically, as shown in the lower portion of FIG. 5, each VRB is further split into two parts in time domain which respectively correspond to two slots (i.e. slot #0 and slot #1) of a PRB. Then, for each VRB, a frequency gap is inserted between its two parts (two slots). Here, the frequency gap means a frequency distance between two slots for a VBR. It is assumed that the frequency gap is 12. That is, as shown in FIG. 5, for VRB 0 for example, its first part is mapped to slot #0 of PRB 0 and its second part is mapped to slot #1 of PRB 12. The same applies for other VRBs. The introduction of a frequency gap will further increase frequency diversity for each VRB.

Since the introduction of a frequency gap is similar with that for RA type 2 with distributed allocation in LTE, no more details thereof will be provided here for avoiding confusion of the inventive point of the present disclosure. It is noted that, although a frequency gap of 12 is introduced as shown in FIG. 5, it is not necessary to introduce any frequency gap for NR RA type 1 with distributed allocation.

As described above, the set of resource allocations may comprise the above three types and the circuitry 210 may select one of them according to specific circumstances such as channel states, quality requirements, system performances and so on. Unlike in LTE, interleaving is performed for and even a same block interleaver is used for all the tree types of resource allocation in NR, the design on the block interleaver is simplified while keeping code-block level diversity equalized.

As described above, the first allocation may correspond to RA type 1 with localized allocation for downlink in NR, the second allocation may correspond to RA type 0 for downlink in NR, and the third allocation may correspond to RA type 1 with distributed allocation for downlink in NR. However, the present disclosure is not limited thereto, these three allocations may corresponds to any other suitable types of resource allocation.

According to an embodiment of the present disclosure, the first allocation and the second allocation perform interleaving based on a subset of a block interleaver on which the third allocation performs interleaving based, the block interleaver being based on a block interleaver used in LTE or otherwise configured depending on configured Resource Block Group (RBG) size.

Specifically, as shown in FIGS. 3-5, only top 3 rows of the block interleaver 301 is used for NR RA type 0 and NR RA type 1 with localized allocation while the entire block interleaver 301 is used for NR RA type 1 with distributed allocation.

In addition, as an example, the block interleaver 301 is based on a LTE block interleaver used for RA type 2 with distributed allocation in LTE. The LTE block interleaver used for RA type 2 has 4 columns and $N_{row}$ rows, which is defined by $N_{row} = \lceil \tilde{N}_{VRB}^{DL}/(4P) \rceil \cdot P$ wherein P is RBG size as described in 3GPP TS 36.213. In addition, as defined in 3GPP TS 36.213, $\tilde{N}_{VRB}^{DL} = N_{VRB}^{DL}$ and $N_{VRB,gap1}^{DL} = 2 \cdot \min(N_{gap}, N_{RB}^{DL} - N_{gap})$ for $N_{gap} = N_{gap,1}$ and $N_{VRB,gap2}^{DL} = \lfloor N_{RB}^{DL}/2N_{gap} \rfloor \cdot 2\tilde{N}_{gap}$ for $N_{gap} = N_{gap,2} \cdot N_{RB}^{DL}$ is number of PRBs in the system bandwidth. $N_{gap}$ is specified frequency distance in terms of PRB between two slots of a PRB pair, which is defined for RA type 2 with distributed allocation in LTE.

It is noted that the block interleaver 301 shown in FIGS. 3-5 is only an example and the present disclosure is not limited thereto.

In NR, RBG size could be configured instead of being specified like in LTE. The basic block interleaver used for NR RA type 1 with distributed allocation may be different depending on configured RBG size. Therefore, the block interleaver (i.e. the subset of the basic block interleaver) used for both NR RA type 0 and NR RA type 1 with consecutive allocation may also be different depending on configured RBG size. Thus, design on the block interleaver may be more flexible.

According to an embodiment of the present disclosure, the block interleaver writes VRB numbers row by row and reads them out column by column, and wherein the number of rows $N_{row}$ of the subset of the block interleaver is determined by $N_{row} = \lceil \tilde{N}_{VRB\_allocated}^{DL} / N_{column} \rceil$ where $\tilde{N}_{VRB\_allocated}^{DL}$ indicates the number of allocated VRBs and $N_{column}$ is the number of columns of the block interleaver, and wherein the number of columns $N_{column}$ of the block interleaver is specified or configured.

Specifically, as shown in FIG. 5, VRB numbers of 0~23 are written row by row to the rectangular matrix of 4 columns, as shown by the arrow indicated by "write", and are read out column by column, as shown by the arrow indicated by "read", for interleaving.

As described above, for NR RA type 0 and NR RA type 1 with consecutive allocation, only a subset of the block interleaver 301 is used for interleaving. A subset of the block interleaver 301 means several rows, instead of all rows, of the block interleaver 301. Here, the number of rows of subset of the block interleaver may be determined by $N_{row} = \lceil \tilde{N}_{VRB\_allocated}^{DL} / N_{column} \rceil$. In the example shown in FIGS. 3 and 4, $N_{column} = 4$ and the number of allocated VRBs is 12, so $N_{row} = 3$.

Figure 6:
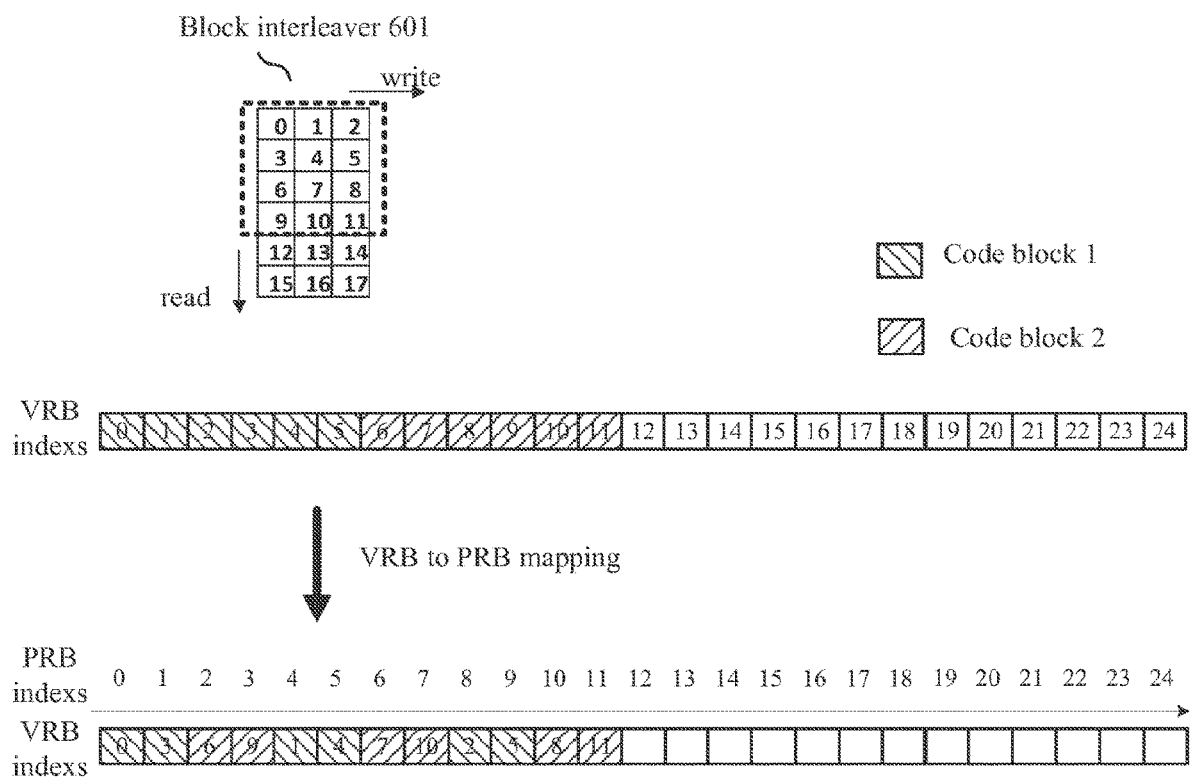
FIG. 6 schematically shows another example of mapping from VRBs to PRBs for NR RA type 1 with localized allocation according to an embodiment of the present disclosure.

It is noted that the number of columns $N_{column}$ of the block interleaver may be specified, for example by standard as 4 as described above. However, the present disclosure is not limited thereto. The number of columns $N_{column}$ of the block interleaver can also be configured depending on specific circumstances. For example, number of columns $N_{column}$ of the block interleaver may be configured as 3. FIG. 6 schematically shows another example of mapping from VRBs to PRBs for NR RA type 1 with localized allocation according to an embodiment of the present disclosure.

In FIG. 6, same contents as those in FIG. 3 is no longer be described here for avoiding redundancy. The difference from FIG. 3 in FIG. 6 is a block interleaver 601 is used in this example. As shown in FIG. 6, the block interleaver 601 has 3 columns, thus $N_{row} = 4$ in accordance with the above equation. That is to say, the top 4 rows of the block interleaver 601 is used for NR RA type 1 with localized allocation, as indicated by dashed line in FIG. 6. As a result, after VRB interleaving, VRBs of indexes 0, 3, 6, 9, 1, 4, 7, 10, 2, 5, 8, 11 are respectively mapped to PRBs of indexes 0-11, as shown in the lower portion of FIG. 6.

Although the specific position where each VRB is mapped in frequency domain is different between FIG. 3 and FIG. 6, the same advantages may be obtained for both examples. In addition, design on the block interleaver may be more flexible.

According to an embodiment of the present disclosure, the specified or configured frequency range is equal to or smaller than the entire carrier bandwidth or bandwidth part.

As described above with reference to FIG. 5, for NR RA type 1 with distributed allocation, in order to get better frequency diversity performance, it is tried to distribute the allocated VRBs into PRBs in the system bandwidth as much as possible. Thus, the interleaving is preferably based on entire system bandwidth. It is noted that, in NR, the carrier bandwidth is possible to be further divided into bandwidth parts. Thus, in this case, the interleaving is preferably based on entire bandwidth part. However, the present disclosure is not limited thereto.

Figure 7:
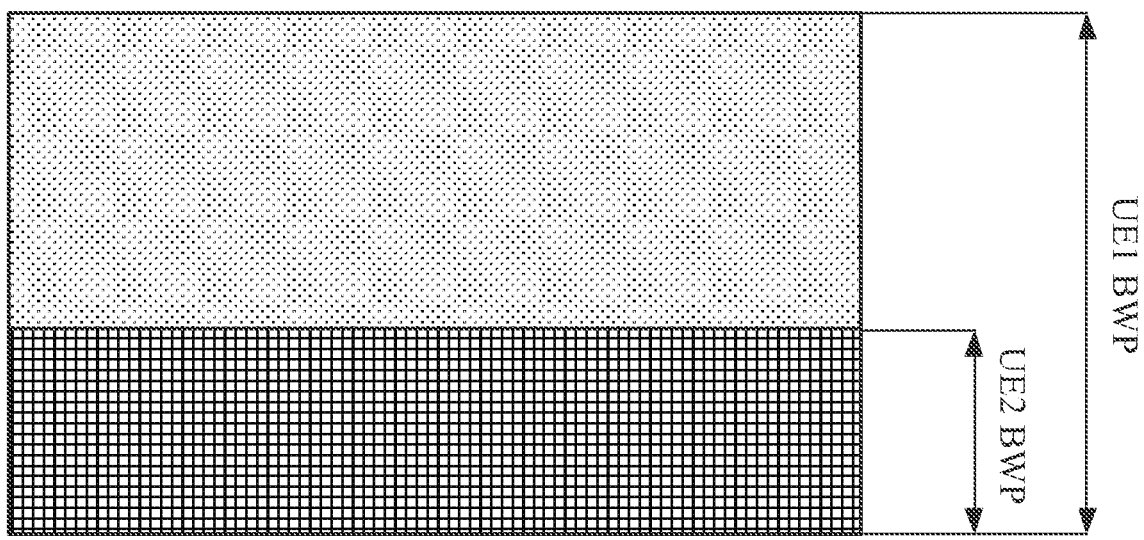
FIG. 7 schematically shows an example case of two overlapped band width parts in NR.

FIG. 7 schematically shows an example case of two overlapped band width parts in NR. As shown in FIG. 7, UE1's BWP and UE2's BWP are overlapped, as indicated by an area filled with grid line. In this case, when the PRBs allocated for UE1 are spanned to the whole bandwidth (i.e., an area filled with dot and the area filled with grid line), it would be difficult to allocate resource for UE2. So when the PRBs allocated for UE1 is only restricted to first half bandwidth (the area filled with dot) even for NR RA type 1 with distributed allocation, the collision between UE1 and UE2 can be avoided.

Figure 8:
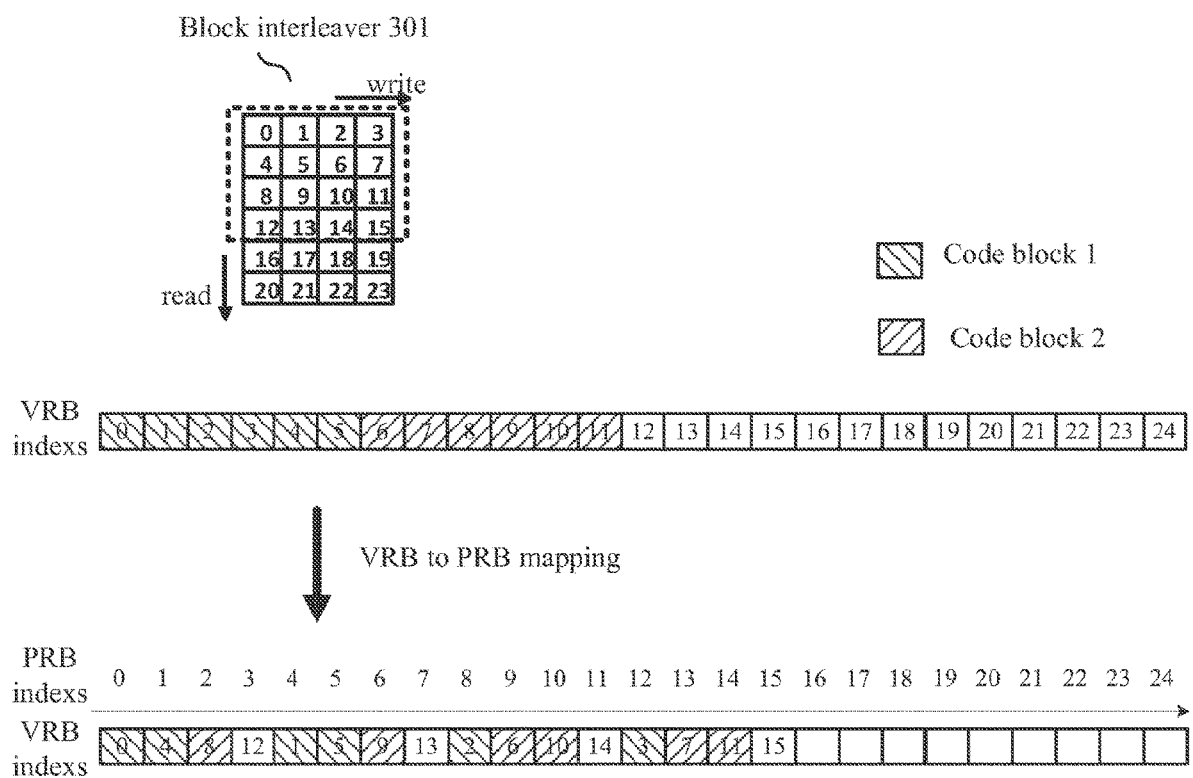
FIG. 8 schematically shows another example of mapping from VRBs to PRBs for NR RA type 1 with distributed allocation according to an embodiment of the present disclosure.

FIG. 8 schematically shows another example of mapping from VRBs to PRBs for NR RA type 1 with distributed allocation according to an embodiment of the present disclosure. In FIG. 8, same contents as those in FIG. 5 is no longer be described here for avoiding redundancy. The difference from FIG. 5 of FIG. 8 is only top 4 rows of the block interleaver 301 is used for NR RA type 1 with distributed allocation instead of the entire block interleaver 301. As a result, 12 consecutive VRBs are distributed to limited bandwidth (i.e. span over PRBs 0-14) instead of the entire bandwidth as show in FIG. 5.

Differently from RA type 1 with distributed allocation in LTE, the number of rows of the block interleaver for NR RA type 1 with distributed allocation may also be configured depending on specific circumstances such as collision. Thereby, it is more flexible to control the spanned bandwidth for distribution by the flexible design on the block interleaver in NR.

It is noted that, as shown in FIGS. 3-6 and 8, VRBs are assigned on basis of one codeblock. However, this is only exemplary and the present disclosure is not limited thereto. Apparently, VRBs may be assigned on basis of more codeblocks, or even in any other suitable unit depending on specific circumstances.

In the above, the BS 200 is described in detail with reference to FIGS. 2-8. With the BS 200, by applying the interleaving within different code blocks, diversity gain is equalized between the code blocks while there is no impact on the scheduling gain.

Figure 9:
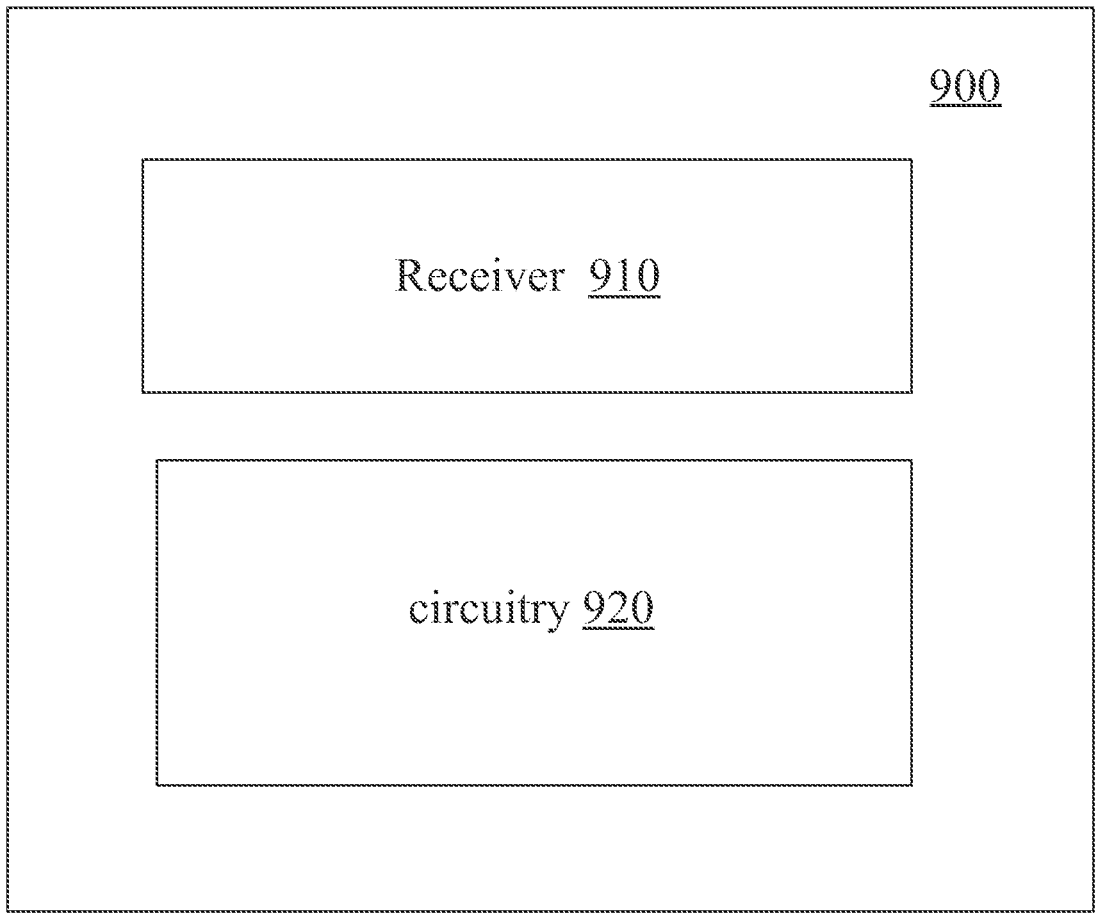
FIG. 9 illustrates a block diagram of a part of a user equipment according to an embodiment of the present disclosure.

In another embodiment of the present disclosure, there is provided a user equipment as shown in FIG. 9. FIG. 9 illustrates a block diagram of a part of a user equipment 900 according to an embodiment of the present disclosure. As shown in FIG. 9, UE 900 may comprise a receiver 910 and circuitry 920. The receiver 910 is operative to receive data transmitted on Physical Resource Blocks (PRBs) and resource allocation information from a base station. The circuitry 920 is operative to decode the data based on the resource allocation information. The resource allocation information indicates on which one of a set of resource allocations the PRBs are allocated for data transmission based. And, the set of resource allocations comprises a first resource allocation of interleaving Virtual Resource Blocks (VRBs) consecutively numbered and mapping the interleaved VRBs to the PRBs consecutive in frequency domain. For example, the base station may be the BS 200 as shown in FIG. 2.

According to an embodiment of the present disclosure, the set of resource allocations may further comprise a second resource allocation of interleaving VRBs consecutively numbered and mapping the interleaved VRBs to the PRBs the positions of which in frequency domain are indicated by a bitmap.

According to an embodiment of the present disclosure, the set of resource allocations may further comprise a third resource allocation of interleaving VRBs consecutively numbered and mapping the interleaved VRBs to the PRBs inconsecutive in frequency domain within a predetermined frequency range.

According to an embodiment of the present disclosure, the first allocation and the second allocation may perform interleaving based on a subset of a block interleaver on which the third allocation performs interleaving based, the block interleaver being based on a block interleaver used in LTE or otherwise configured depending on configured Resource Block Group (RBG) size.

According to an embodiment of the present disclosure, the block interleaver writes VRB numbers row by row and reads them out column by column, and wherein the number of rows $N_{row}$ of the subset of the block interleaver is determined by $N_{row} = \lceil \tilde{N}_{VRB\_allocated}^{DL} / N_{column} \rceil$ where $\tilde{N}_{VRB\_allocated}^{DL}$ indicates the number of allocated VRBs and $N_{column}$ is the number of columns of the block interleaver, and wherein the number of columns $N_{column}$ of the block interleaver is specified or configured.

According to an embodiment of the present disclosure, the specified or configured frequency range is equal to or smaller than the entire carrier bandwidth or bandwidth part.

According to an embodiment of the present disclosure, after interleaving, the third allocation further introduces a frequency gap on slot basis for each VRB.

According to an embodiment of the present disclosure, the first allocation corresponds to RA type 1 with localized allocation for downlink in NR, the second allocation corresponds to RA type 0 for downlink in NR, and the third allocation corresponds to RA type 1 with distributed allocation for downlink in NR.

With UE 900, by applying the interleaving within different code blocks, diversity gain is equalized between the code blocks while there is no impact on the scheduling gain.

Figure 10:
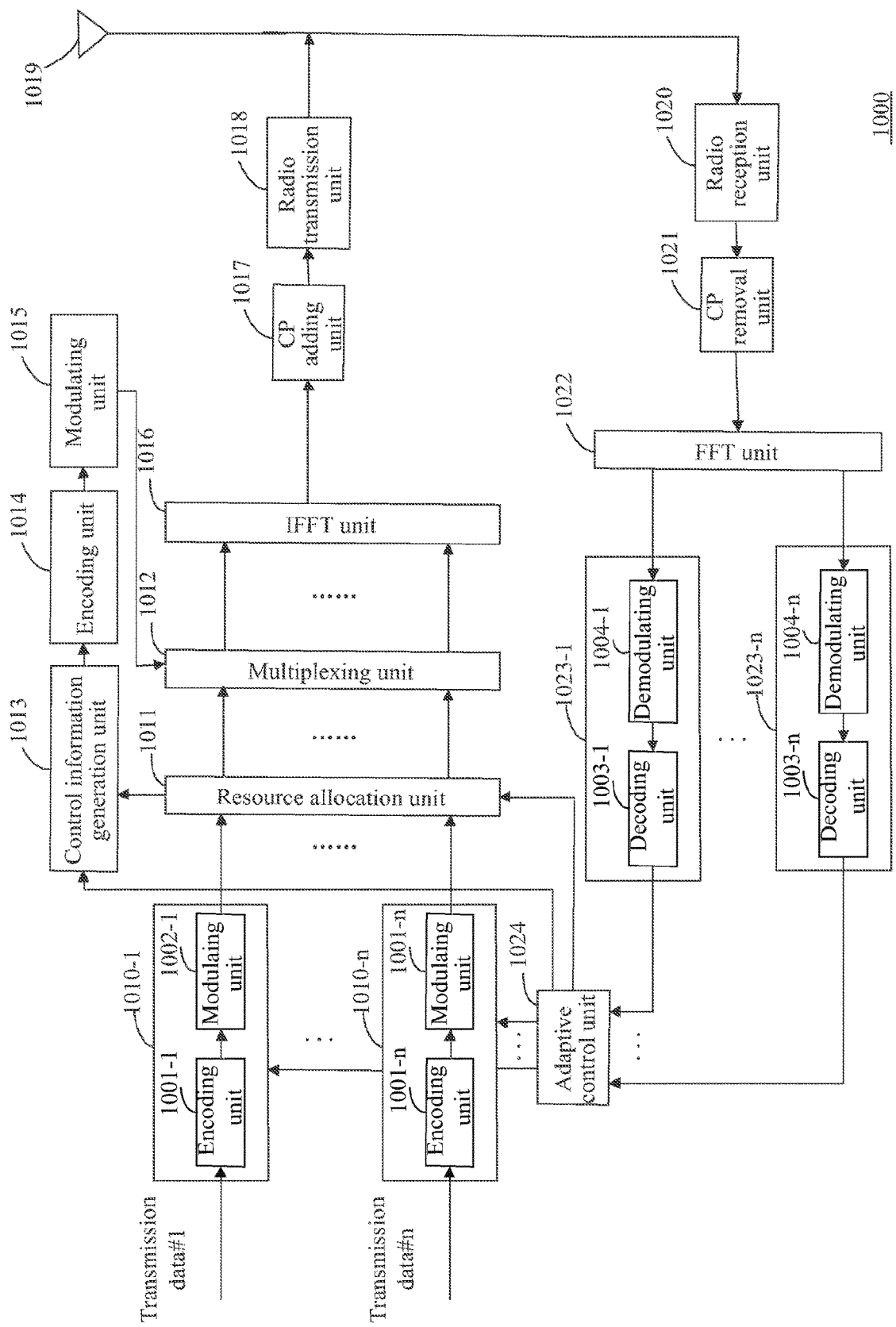
FIG. 10 illustrates a block diagram of details of a base station according to an embodiment of the present disclosure.

FIG. 10 illustrates a block diagram of details of a base station 1000 according to an embodiment of the present disclosure.

The base station 1000 is equipped with n encoding and modulating sections 1010-1 through 1010-n, each comprising an encoding unit 1001 (1001-1 through 1001-n) and a modulating unit 1002 (1002-1 through 1002-n), for transmission data #1 through transmission data #n. In the encoding and modulating sections 1010-1 through 1010-n, the encoding units 1001-1 through 1001-n perform encoding processing on transmission data #1 through #n respectively, and the modulating units 1002-1 through 1002-n perform modulation processing on post-encoding transmission data to generate a data symbol respectively. The coding rate and modulation scheme used at this time may be in accordance with MCS (Modulation and Coding Scheme) information input from an adaptive control unit 1024.

A resource allocation unit 1011 allocates the data symbol to PRBs in accordance with control from the adaptive control unit 1024, and performs output to a multiplexing unit 1012. More specifically, the resource allocation unit 1011 may perform VRB interleaving and then perform mapping from VRBs to PRBs as described above. The resource allocation unit 1011 may also outputs resource allocation information to a control information generation unit 1013. For example, when NR RA type 0 is used by resource allocation unit 1011, the resource allocation information may include bitmap. Or, when NR RA type 1 with localized allocation is used by resource allocation unit 1011, the resource allocation information may include the starting frequency position and allocated size.

The control information generation unit 1013 generates control information comprising the resource allocation information and MCS information input from the adaptive control unit 1024, and outputs this control information to an encoding unit 1014.

The encoding unit 1014 performs encoding processing on the control information, and a modulating unit 1015 performs modulation processing on the post-encoding control information and outputs the control information to a multiplexing unit 1012.

The multiplexing unit 1012 multiplexes control information with data symbols input from the resource allocation unit 1011, and outputs the resulting signals to an IFFT (Inverse Fast Fourier Transform) unit 1016. Control information multiplexing is performed on a subframe-by-subframe basis, for example. It is noted that, either time domain multiplexing or frequency domain multiplexing may be used for control information multiplexing.

The IFFT unit 1016 performs IFFT processing on a plurality of subcarriers in the PRBs to which control information and a data symbol are mapped, to generate an OFDM (Orthogonal Frequency Division Multiplexing) symbol that is a multicarrier signal. A CP (Cyclic Prefix) adding unit 1017 adds a signal identical to the end part of an OFDM symbol to the start of the OFDM symbol as a CP. A radio transmission unit 1018 performs transmission processing such as D/A conversion, amplification, and up-conversion on a post-CP-addition OFDM symbol, and transmits it to one or more user equipment from an antenna 1019.

Meanwhile, a radio reception unit 1020 receives n OFDM symbols transmitted from one or more user equipment via the antenna 1019, and performs reception processing such as down-conversion and A/D conversion on these OFDM symbols. A CP removal unit 1021 removes a CP from a post-reception-processing OFDM symbol.

An FFT (Fast Fourier Transform) unit 1022 performs FFT processing on a post-CP-removal OFDM symbol, to obtain signals multiplexed in the frequency domain. Here, signals may include received quality information reported from the user equipment. The user equipment can perform received quality measurement. Received quality information may be expressed as a CQI (Channel Quality Indicator), CSI (Channel State Information), or the like.

In demodulating and decoding sections 1023-1 through 1023-n, demodulating units 1004-1 through 1004-n perform demodulation processing on a post-FFT signal respectively, and decoding units 1003-1 through 1003-n perform decoding processing on a post-demodulation signal respectively. By this means, received data is obtained. Received quality information within the received data is input to the adaptive control unit 1024, which performs adaptive control on transmission data based on received quality information and performs frequency scheduling that decides for the resource allocation unit 1011 to which PRB each data is allocated.

Note that, the base station 1000 shown in FIG. 10 may function as BS 200 as shown in FIG. 2. Specifically, the radio transmission unit 1018 may correspond to the transmitter 220. The circuitry 210 may include the encoding and modulating sections 1010-1 through 1010-n, the resource allocation unit 1011, the multiplexing unit 1012, the control information generation unit 1013, the encoding unit 1014, the modulating unit 1015, the IFFT unit 1016, the CP adding unit 1017, the CP removal unit 1021, the FFT unit 1022, the demodulating and decoding sections 1023-1 through 1023-n and the adaptive control unit 1024. Apparently, one of more of these units may also be separated from the circuitry 210 depending on specific requirements.

Figure 11:
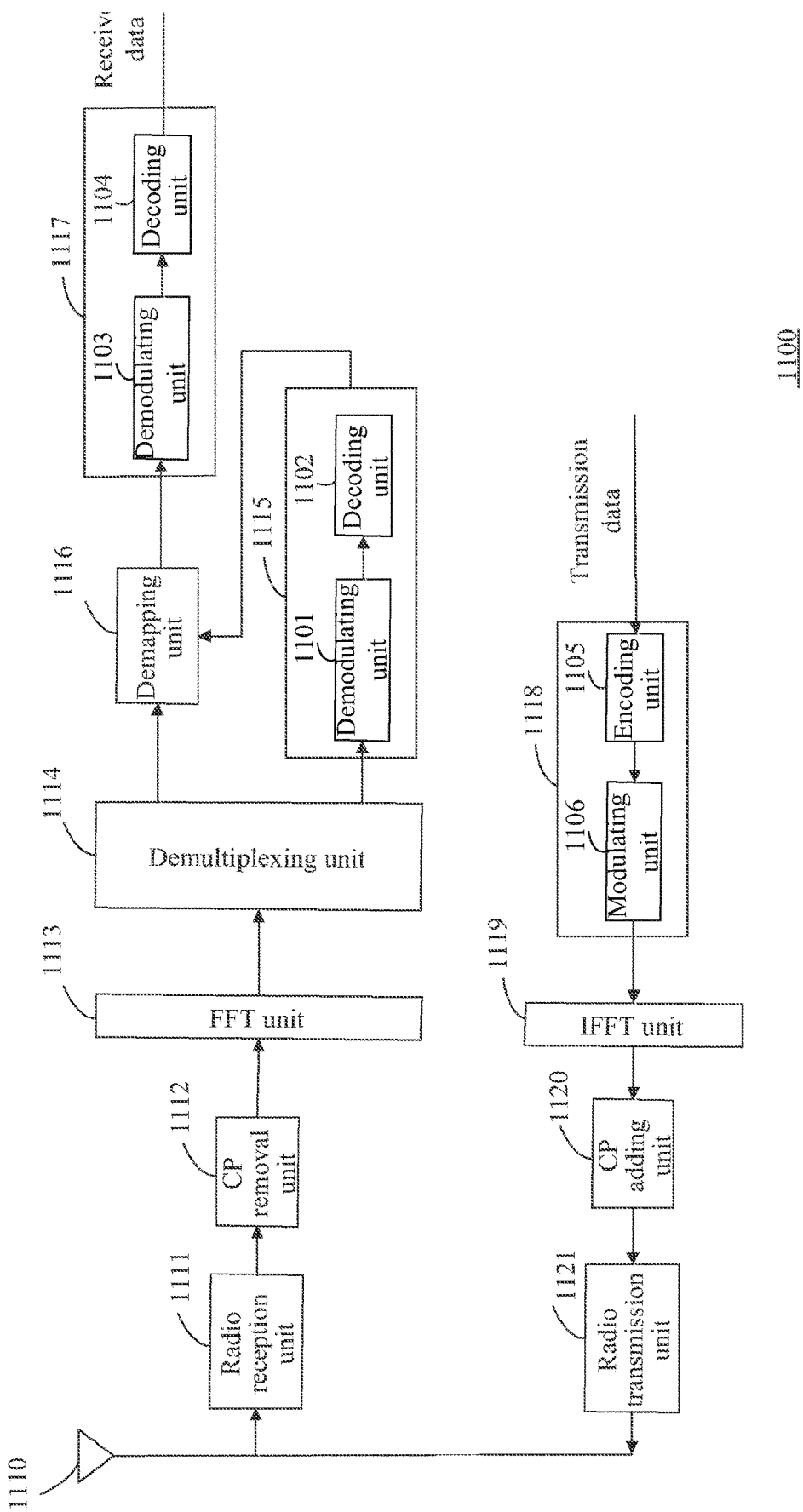
FIG. 11 illustrates a block diagram of details of a user equipment according to an embodiment of the present disclosure.

FIG. 11 illustrates a block diagram of details of a user equipment 1100 according to an embodiment of the present disclosure.

In the user equipment 1100 as shown in FIG. 11, a radio reception unit 1111 receives an OFDM symbol transmitted from a base station via an antenna 1100, and performs reception processing such as up-conversion and A/D conversion on the OFDM symbol. An CP removal unit 1112 removes a CP from a post-reception-processing OFDM symbol. An FFT unit 1113 performs FFT processing on a post-CP-removal OFDM symbol, to obtain a received signal in which control information and a data symbol are multiplexed. A demultiplexing unit 1114 demultiplexes a post-FFT received signal into a control signal and data symbol. Then, the demultiplexing unit 1114 outputs the control signal to a demodulating and decoding section 1115, and outputs the data symbol to a demapping unit 1116.

In the demodulating and decoding section 1115, a demodulating unit 1101 performs demodulation processing on the control signal, and a decoding unit 1102 performs decoding processing on the post-demodulation signal. Here, control information may include resource allocation information and MCS information. Then, the demodulating and decoding section 1115 outputs the resource allocation information within the control information to the demapping unit 1116.

Based on the resource allocation information input from the demodulating and decoding section 1115, the demapping section 1116 extracts a data symbol from PRBs based on the resource allocation information. Specifically, as described above, when NR RA type 0 is used, the resource allocation information may include bitmap. Or, when NR RA type 1 with localized allocation is used, the resource allocation information may include the starting frequency position and allocated size. Then, the demapping unit 1116 outputs the extracted data symbol to a demodulating and decoding section 1117.

In the demodulating and decoding section 1117, a demodulating unit 1103 performs demodulation processing on a data symbol input from the demapping unit 1116, and a decoding unit 1104 performs decoding processing on the post-demodulation signal. By this means, received data is obtained.

Meanwhile, in an encoding and modulating section 1118, an encoding unit 1105 performs encoding processing on transmission data, and a modulating unit 1106 performs modulation processing on post-encoding transmission data to generate a data symbol. An IFFT unit 1119 performs IFFT processing on a plurality of subcarriers in PRBs to which a data symbol input from the encoding and modulating section 1118 is allocated, to generate an OFDM symbol that is a multicarrier signal. A CP adding unit 1120 adds a signal identical to the end part of an OFDM symbol to the start of the OFDM symbol as a CP. A radio transmission unit 1121 performs transmission processing such as D/A conversion, amplification, and up-conversion on a post-CP-addition OFDM symbol, and transmits it to a base station from the antenna 1110.

Note that, the user equipment 1100 shown in FIG. 11 may function as UE 900 as shown in FIG. 9. Specifically, the radio reception unit 1111 may correspond to the receiver 910. The circuitry 920 may include the CP removal unit 1112, the FFT unit 1113, demultiplexing unit 1114, the demodulating and decoding sections 1115, 1117, the demapping unit 1116, the encoding and modulating section 1118, the IFFT unit 1119, the CP adding unit 1120. Apparently, one of more of these units may also be separated from the circuitry 920 depending on specific requirements.

Figure 12:
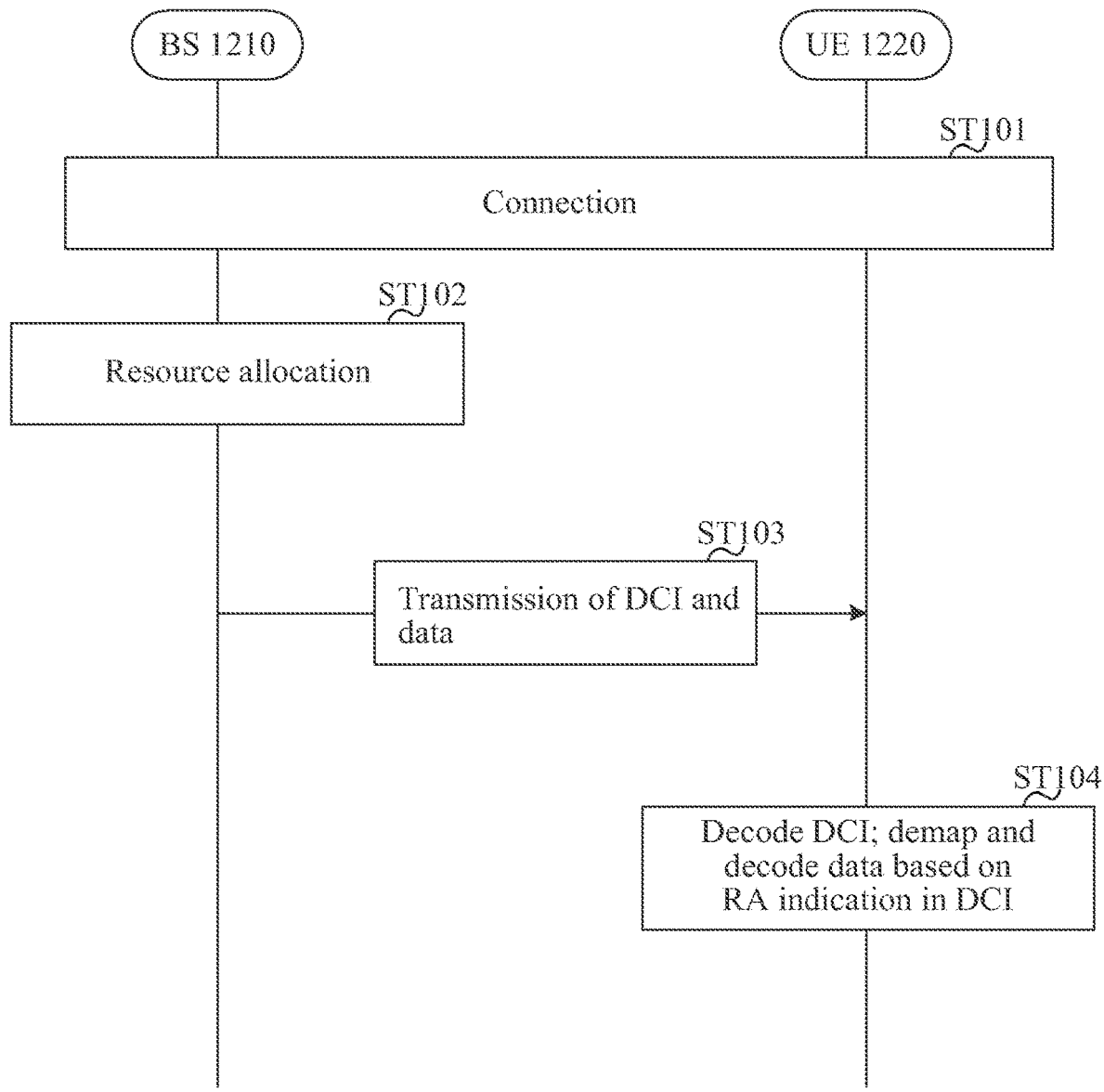
FIG. 12 schematically shows an example of a flowchart of communication between a base station and a user equipment according to an embodiment of the present disclosure.

FIG. 12 schematically shows an example of a flowchart of communication between a BS 1210 and a UE 1220 according to an embodiment of the present disclosure. For example, the BS 1210 may be the BS 200 as shown in FIG. 2 or the base station 1000 shown in FIG. 10, and the UE 1220 may be the UE 900 as shown in FIG. 9. or the user equipment 1100 shown in FIG. 11.

At a step ST101, the UE 1220 connects with the BS 1210 in a connection procedure. The connection may be established by implementing known or future developed method whose details are omitted herein.

At a step ST102, the BS 1210 performs resource allocation, that is, allocates PRBs for data transmission based on one of a set of resource allocations. As described above, the BS 1210 may include the circuitry 210 as the BS 200 shown in FIG. 2, and the step ST102 may be performed by the circuitry 210.

At a step ST103, the BS 1210 transmits the DCI and data on the allocated PRBs to the UE 1220. As described above, the BS 1210 may also include the transmitter 220 as the BS 200 shown in FIG. 2, and the step ST103 may be performed by the transmitter 220.

At a step ST 104, the UE 1220 decode DCI, and demap and decode data based on RA indication in DCI. For example, the RA indication corresponds to the resource allocation information as described above, which indicates on which one of a set of resource allocations the PRBs are allocated for data transmission based. the UE 1220 may include the circuitry 920 as the UE 900 shown in FIG. 9, and the step ST104 may be performed by the circuitry 920.

Figure 13:
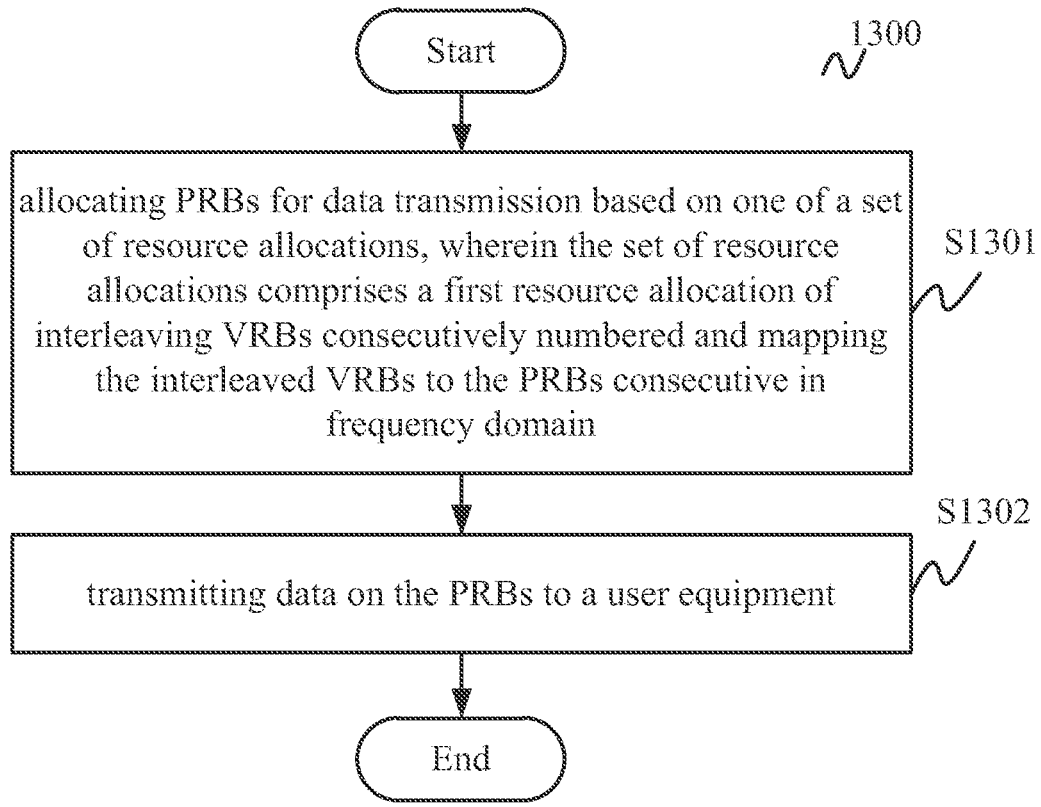
FIG. 13 illustrates a flowchart of a wireless communication method for a base station according to an embodiment of the present disclosure.

In a further embodiment of the present disclosure, there is provided a wireless communication method for a base station as shown in FIG. 13. FIG. 13 illustrates a flowchart of a wireless communication method 1300 for a base station according to an embodiment of the present disclosure. For example, the wireless communication method 1300 may be applied to the BS 200/1000 as shown in FIGS. 2 and 10.

As shown in FIG. 13, the wireless communication method 1300 starts at a step S1301 in which Physical Resource Blocks (PRBs) are allocated for data transmission based on one of a set of resource allocations, wherein the set of resource allocations comprises a first resource allocation of interleaving Virtual Resource Blocks (VRBs) consecutively numbered and mapping the interleaved VRBs to the PRBs consecutive in frequency domain. Then, at a step S1302, data is transmitted on the PRBs to a user equipment. After the step S1302, the wireless communication method 1300 is ended. For example, the user equipment may be UE 900/1100 as shown in FIGS. 9 and 11.

With the wireless communication method 1300, by applying the interleaving within different code blocks, diversity gain is equalized between the code blocks while there is no impact on the scheduling gain.

Note that, the other technical features in the base station 200 as described above can also be incorporated in the wireless communication method 1300 and will not be described here for avoiding redundancy.

Figure 14:
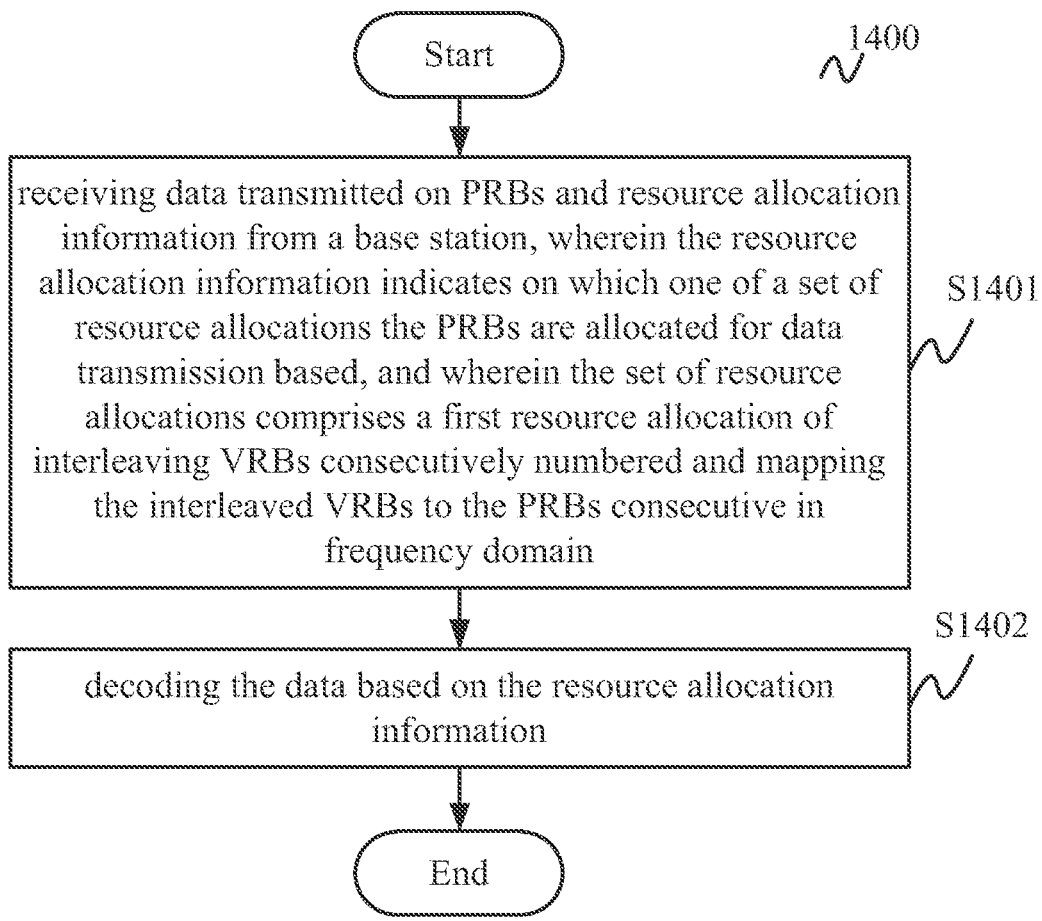
FIG. 14 illustrates a flowchart of a wireless communication method for a user equipment according to an embodiment of the present disclosure.

In a further embodiment of the present disclosure, there is provided a wireless communication method for a user equipment as shown in FIG. 14. FIG. 14 illustrates a flowchart of a wireless communication method 1400 for a user equipment according to an embodiment of the present disclosure. For example, the wireless communication method 1400 may be applied to the UE 900/1100 as shown in FIGS. 9 and 11.

As shown in FIG. 14, the wireless communication method 1400 starts at a step S1401 in which, data transmitted on Physical Resource Blocks (PRBs) and resource allocation information is received from a base station, wherein the resource allocation information indicates on which one of a set of resource allocations the PRBs are allocated for data transmission based, and wherein the set of resource allocations comprises a first resource allocation of interleaving Virtual Resource Blocks (VRBs) consecutively numbered and mapping the interleaved VRBs to the PRBs consecutive in frequency domain. Then, at a step S1402, the data is decoded based on the resource allocation information. After the step S1402, the wireless communication method 1400 is ended. For example, the base station may be the BS 200/1000 as shown in FIGS. 2 and 10.

With the wireless communication method 1400, by applying the interleaving within different code blocks, diversity gain is equalized between the code blocks while there is no impact on the scheduling gain.

Note that, the other technical features in the user equipment 900 as described above can also be incorporated in the wireless communication method 1400 and will not be described here for avoiding redundancy.

In the above, the description with reference to FIGS. 2-14 is focused on resource allocation for downlink in NR. However, the present disclosure is not limited to downlink, but is also applicable to uplink.

Figure 15:
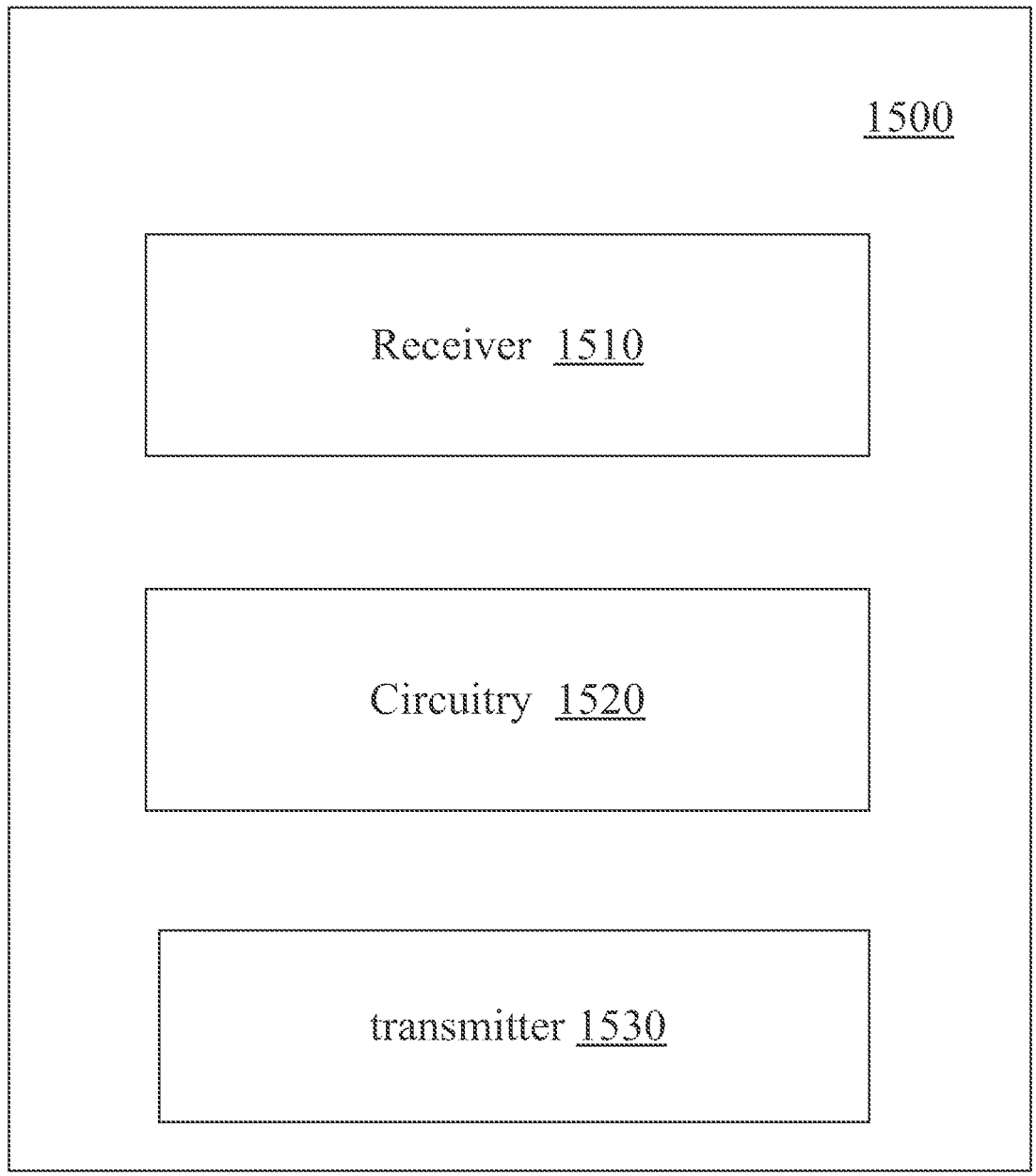
FIG. 15 illustrates a block diagram of a part of a user equipment according to another embodiment of the present disclosure.

In an embodiment of the present disclosure, there is provided a user equipment as shown in FIG. 15. FIG. 15 illustrates a block diagram of a part of a user equipment 1500 according to another embodiment of the present disclosure. As shown in FIG. 15, the UE 1500 may include a receiver 1510, circuitry 1520 and a transmitter 1530. The receiver 1510 is operative to receive resource allocation information from a base station. The circuitry 1520 is operative to allocate Physical Resource Blocks (PRBs) for data transmission based on the resource allocation information. The transmitter 1530 is operative to transmit data on the PRBs to the base station. The resource allocation information indicates on which one of a set of resource allocations the PRBs are allocated for data transmission based. And, the set of resource allocations comprises: a fourth resource allocation of interleaving Virtual Resource Blocks (VRBs) consecutively numbered and mapping the interleaved VRBs to the PRBs consecutive in frequency domain.

Figure 16:
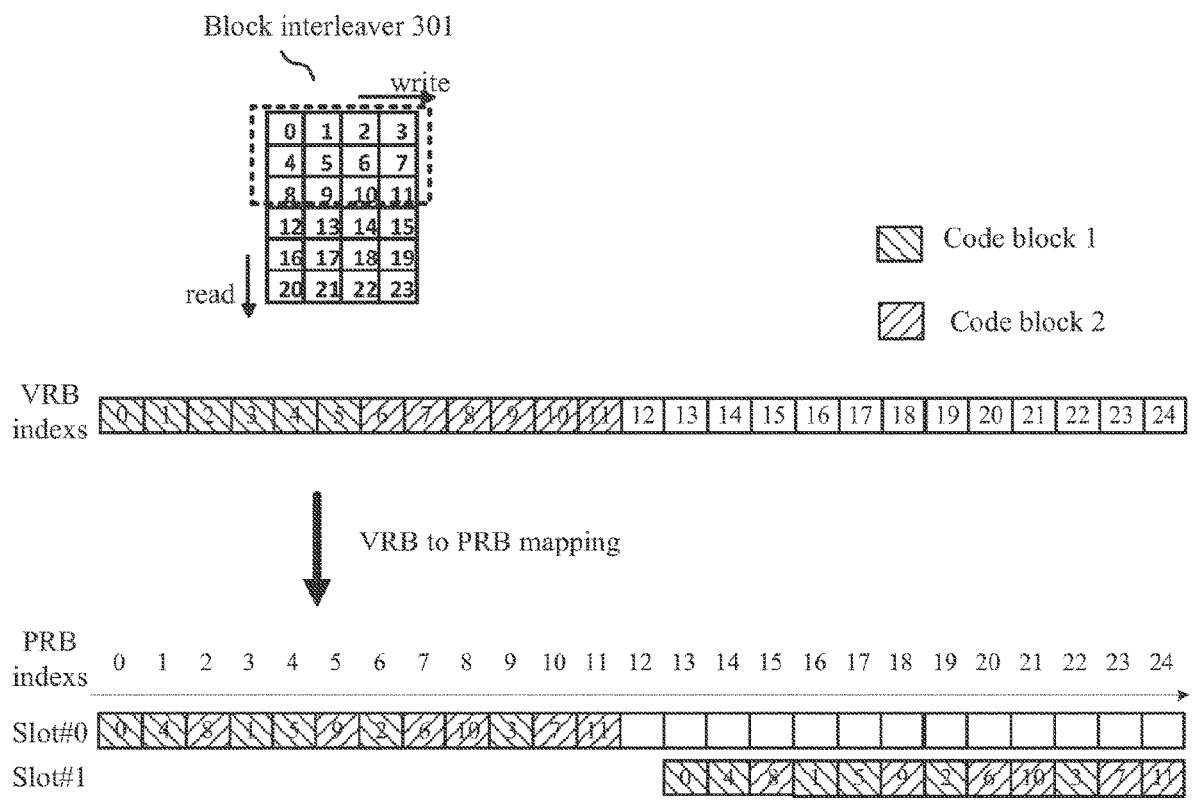
FIG. 16 schematically shows an example of mapping from VRBs to PRBs for NR RA type 1 with localized allocation according to another embodiment of the present disclosure.

It is noted that NR RA type 1 with localized allocation is used for not only downlink but also uplink. Thus, in order to facilitate understanding, NR RA type 1 with localized allocation is taken as an example of the fourth resource allocation here. That is to say, when the resource information indicates that NR RA type 1 with localized allocation is used for uplink, UE 1500 perform resource allocation for uplink data transmission, that is, mapping data to PRBs allocated based on NR RA type 1 with localized allocation. Specifically, FIG. 16 schematically shows an example of mapping from VRBs to PRBs for NR RA type 1 with localized allocation according to another embodiment of the present disclosure.

Similarly with FIG. 3 of NR RA type 1 with localized allocation for uplink, consecutive 6 VRBs numbered in 0, 1, 2, 3, 4, 5 (i.e. with indexes 0, 1, 2, 3, 4, 5) are used for code block 1, as indicated by boxes filled with left slashes, while consecutive 6 VRBs numbered in 6, 7, 8, 9, 10, 11 (i.e. with indexes 6, 7, 8, 9, 10, 11) are used for code block 2, as indicated by boxes filled with right slashes. And, the top 3 rows of the block interleaver 301 may be used to perform interleaving among consecutive 12 VRBs numbered in 0, 1, 2, 3, 4, 5, 6, 7, 8, 9, 10, 11. As a result, VRBs numbered in 0, 4, 8, 1, 5, 9, 2, 6, 10, 3, 7, 11 are respectively mapped to PRBs numbered in 0, 1, 2, 3, 4, 5, 6, 7, 8, 9, 10, 11. Since the VRB interleaving and mapping from VRBs to PRBs are similar as those of the base station 200 as described above, details thereof will not be discussed here for avoiding redundancy.

Likewise, since interleaving is applied within these two code blocks, diversity gain is equalized between these two code blocks. In addition, since interleaving is applied only within these two code blocks instead of the entire bandwidth, that is, interleaving is performed on assigned VRBs, the frequency position as a whole where they are mapped will not change. And, there is no impact on the scheduling gain.

According to an embodiment of the present disclosure, the set of resource allocations may further comprise a fifth resource allocation of interleaving VRBs consecutively numbered and mapping the interleaved VRBs to the PRBs the positions of which in frequency domain are indicated by a bitmap.

Specifically, NR RA type 0 may also be used for uplink in NR. Since resource allocation of NR RA type 0 for uplink is the same as that for downlink and the latter is already explained in detail with reference to FIG. 4, no more description will be provided here for avoiding redundancy.

According to an embodiment of the present disclosure, after interleaving, the fourth allocation and/or the fifth further introduces a frequency hopping between two slots or within a slot for each VRB.

Specifically, as shown in FIG. 16, each VRB is further split into two parts in time domain which respectively correspond to two slots (i.e. slot #0 and slot #1) of a PRB. Then, for each VRB, a frequency hopping is applied between its two parts (two slots). Here, the frequency hopping means a frequency distance between two slots for a VBR. It is assumed that the frequency distance is 12. That is, as shown in FIG. 16, for VRB 0 for example, its first part is mapped to slot #0 of PRB 0 and its second part is mapped to slot #1 of PRB 12. The same applies for other VRBs. The introduction of a frequency hopping will further increase frequency diversity for each VRB.

It is noted that, the frequency hopping may also be applicable for NR RA type 0 for uplink. In addition, the frequency hopping may be introduced not only between two slots as shown in FIG. 16, but also within a slot. For example, in some cases, one slot may further be divided to two parts in NR to apply the frequency hopping.

Since the introduction of a frequency hopping is similar with that for uplink in LTE, no more details thereof will be provided here for avoiding confusion of the inventive point of the present disclosure. It is noted that, although a frequency hopping of 12 is introduced as shown in FIG. 16, it is not necessary to introduce any frequency hopping for resource allocation of uplink in NR.

According to an embodiment of the present disclosure, the fourth allocation and the fifth allocation perform interleaving based on a subset of a block interleaver which is based on a block interleaver used in LTE or otherwise configured depending on configured Resource Block Group (RBG) size.

According to an embodiment of the present disclosure, the block interleaver writes VRB numbers row by row and reads them out column by column, and wherein the number of rows $N_{row}$ of the subset of the block interleaver is determined by $N_{row} = \lceil \tilde{N}_{VRB\_allocated}^{DL}/N_{column} \rceil$ where $\tilde{N}_{VRB\_allocated}^{DL}$ indicates the number of allocated VRBs and $N_{column}$ is the number of columns of the block interleaver, and wherein the number of columns $N_{column}$ of the block interleaver is specified or configured.

The block interleaver used for downlink (for example, the block interleavers 301 and 601) may also be used for uplink. Since detailed explanation of the block interleaver is already provided above, no more discussion will be presented here for avoiding redundancy.

As described above, the set of resource allocations for uplink may comprise the above two types and the base station may select one of them according specific circumstances such as channel states, quality requirements, system performances and so on and notifies the decision to UE 1500 via the resource allocation information. Unlike in LTE, interleaving is performed for and even a same block interleaver is used for the two types of resource allocation for uplink and the three types of resource allocation for downlink in NR, the design on the block interleaver is simplified while keeping code-block level diversity equalized.

As described above, the fourth allocation may correspond to RA type 1 with localized allocation for uplink in NR, and the fifth allocation may correspond to RA type 0 for uplink in NR. However, the present disclosure is not limited thereto, these two allocations may corresponds to any other suitable types of resource allocation.

Figure 17:
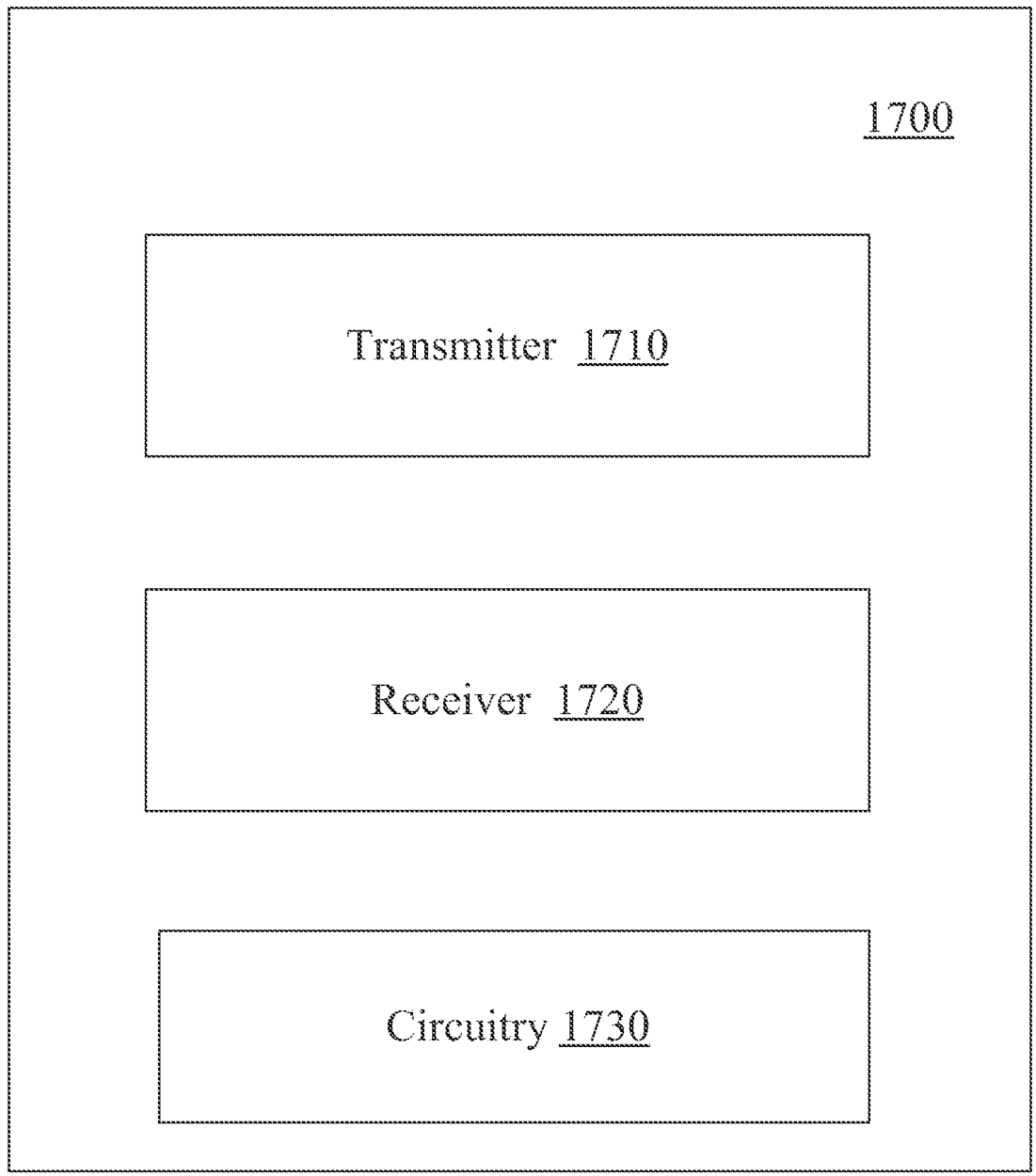
FIG. 17 illustrates a block diagram of a part of a base station according to another embodiment of the present disclosure.

In another embodiment of the present disclosure, there is provided a base station as shown in FIG. 17. FIG. 17 illustrates a block diagram of a part of a base station 1700 according to another embodiment of the present disclosure. As shown in FIG. 17, BS 1700 may comprise a transmitter 1710, a receiver 1720 and circuitry 1730. The transmitter 1710 is operative to transmit resource allocation information to a user equipment. The receiver 1720 is operative to receive data transmitted on Physical Resource Blocks (PRBs), which are allocated based on the resource allocation information, from the user equipment. The circuitry 1730 is operative to decode the data. The resource allocation information indicates on which one of a set of resource allocations the PRBs are allocated for data transmission based. And, the set of resource allocations comprises a fourth resource allocation of interleaving Virtual Resource Blocks (VRBs) consecutively numbered and mapping the interleaved VRBs to the PRBs consecutive in frequency domain. For example, the user equipment may be the UE 1500 as shown in FIG. 15.

According to an embodiment of the present disclosure, the set of resource allocations further comprises: a fifth resource allocation of interleaving VRBs consecutively numbered and mapping the interleaved VRBs to the PRBs the positions of which in frequency domain are indicated by a bitmap.

According to an embodiment of the present disclosure, the fourth allocation and the fifth allocation perform interleaving based on a subset of a block interleaver which is based on a block interleaver used in LTE or otherwise configured depending on configured Resource Block Group (RBG) size.

According to an embodiment of the present disclosure, the block interleaver writes VRB numbers row by row and reads them out column by column, and wherein the number of rows $N_{row}$ of the subset of the block interleaver is determined by $N_{row} = \lceil \tilde{N}_{VRB\_allocated}^{DL} / N_{column} \rceil$ where $\tilde{N}_{VRB\_allocated}^{DL}$ indicates the number of allocated VRBs and $N_{column}$ is the number of columns of the block interleaver, and wherein the number of columns $N_{column}$ of the block interleaver is specified or configured.

According to an embodiment of the present disclosure, after interleaving, the fourth allocation and/or the fifth further introduces a frequency hopping between two slots or within a slot for each VRB.

According to an embodiment of the present disclosure, the fourth allocation corresponds to RA type 1 with localized allocation for uplink in NR, and the fifth allocation corresponds to RA type 0 for uplink in NR.

With BS 1700, by applying the interleaving within different code blocks, diversity gain is equalized between the code blocks while there is no impact on the scheduling gain.

It is noted that, the UE 1100 shown in FIG. 11 may also function as UE 1500 as shown in FIG. 15. Specifically, the radio reception unit 1111 may correspond to the receiver 1510 and the radio transmission unit 1121 may correspond to the transmitter 1530. The circuitry 1520 may include the CP removal unit 1112, the FFT unit 1113, demultiplexing unit 1114, the demodulating and decoding sections 1115, 1117, the demapping unit 1116, the encoding and modulating section 1118, the IFFT unit 1119, the CP adding unit 1120. Apparently, one of more of these units may also be separated from the circuitry 1720 depending on specific requirements.

In addition, although not shown in FIG. 11, before the encoding and modulating section 1118, the UE 1100 may also include a mapping (or resource allocation) unit to perform VRB interleaving and mapping from VRBs to PRBs. When the UE 1100 shown in FIG. 11 functions as UE 1500, the radio reception unit 1111 may receive resource allocation information from a base station.

Similarly, the BS 1000 shown in FIG. 10 may also function as BS 1700 as shown in FIG. 17. Specifically, the radio transmission unit 1018 may correspond to the transmitter 1710 and the radio reception unit 1020 may correspond to the receiver 1720. The circuitry 1720 may include the encoding and modulating sections 1010-1 through 1010-*n*, the resource allocation unit 1011, the multiplexing unit 1012, the control information generation unit 1013, the encoding unit 1014, the modulating unit 1015, the IFFT unit 1016, the CP adding unit 1017, the CP removal unit 1021, the FFT unit 1022, the demodulating and decoding sections 1023-1 through 1023-*n* and the adaptive control unit 1024. Apparently, one of more of these units may also be separated from the circuitry 1520 depending on specific requirements.

Figure 18:
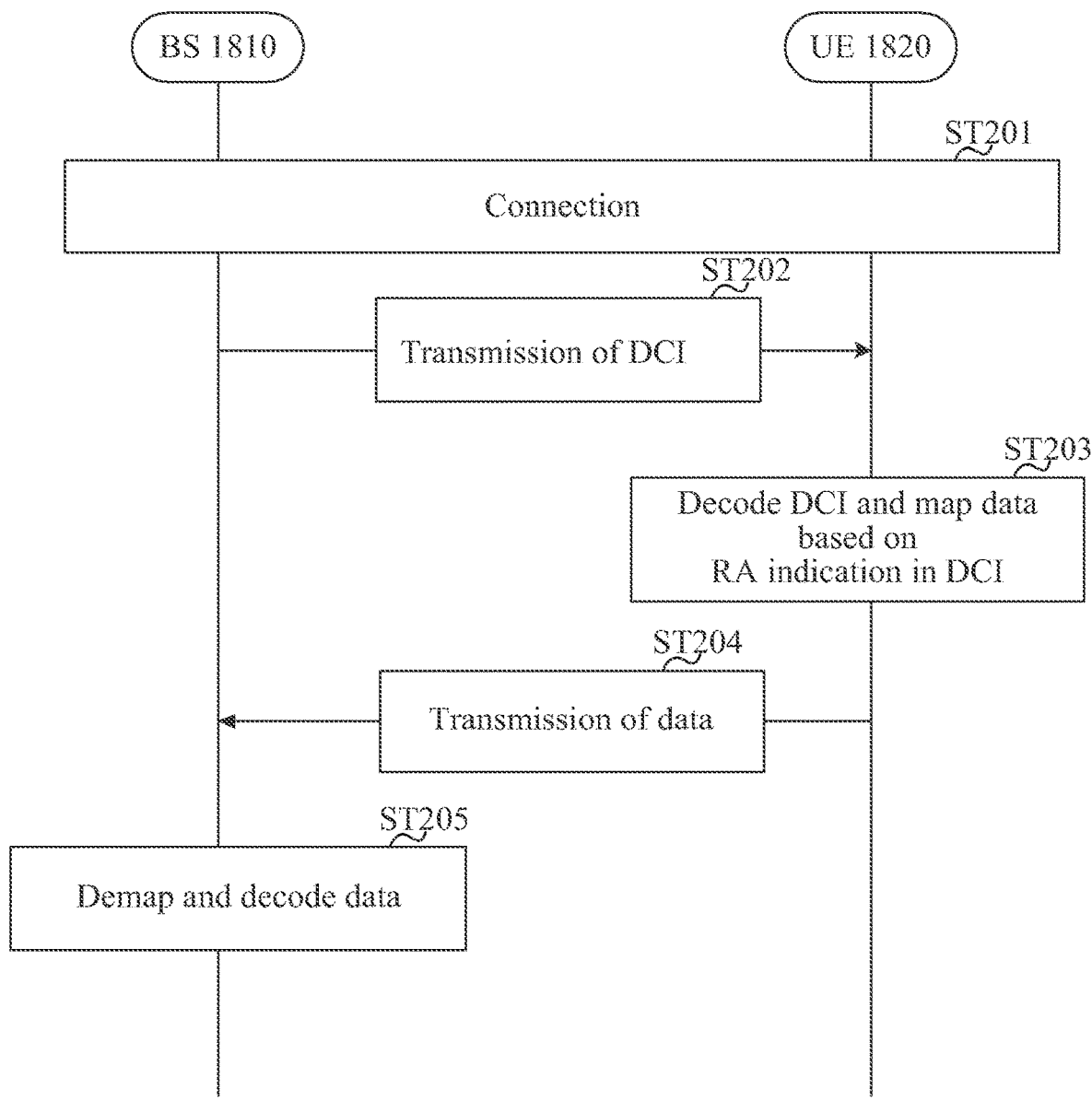
FIG. 18 schematically shows another example of a flowchart of communication between a base station and a user equipment according to an embodiment of the present disclosure.

FIG. 18 schematically shows another example of a flowchart of communication between a BS 1810 and a UE 1820 according to an embodiment of the present disclosure. For example, the BS 1810 may be the BS 1700 as shown in FIG. 17, and the UE 1820 may be the UE 1500 as shown in FIG. 15.

At a step ST201, the UE 1820 connects with the BS 1810 in a connection procedure. The connection may be established by implementing known or future developed method whose details are omitted herein.

At a step ST202, the BS 1810 transmits DCI to the UE 1820. For example, DCI include resource allocation information. As described above, the BS 1810 may include the transmitter 1710 as the BS 1700 shown in FIG. 17, and the step ST202 may be performed by the transmitter 1710.

At a step ST 203, the UE 1820 decode DCI received from the BS 1810 and map data to PRBs based on RA indication in DCI. More specifically, the UE 1820 allocates PRBs for data transmission based on the RA indication. As described above, the UE 1820 may include the circuitry 1520 as the UE 1500 shown in FIG. 15, and the step ST203 may be performed by the circuitry 1520. For example, the RA indication corresponds to the resource allocation information as described above, which indicates on which one of a set of resource allocations the PRBs are allocated for data transmission based.

At a step ST204, the UE 1820 transmits the data on the allocated PRBs to the BS 1810. As described above, the UE 1820 may also include the transmitter 1530 as the UE 1500 shown in FIG. 15, and the step ST204 may be performed by the transmitter 1530.

At a step ST 205, the BS 1810 demap and decode data. As described above, the BS 1810 may include the circuitry 1730 as the BS 1700 shown in FIG. 17, and the step ST205 may be performed by the circuitry 1730.

Figure 19:
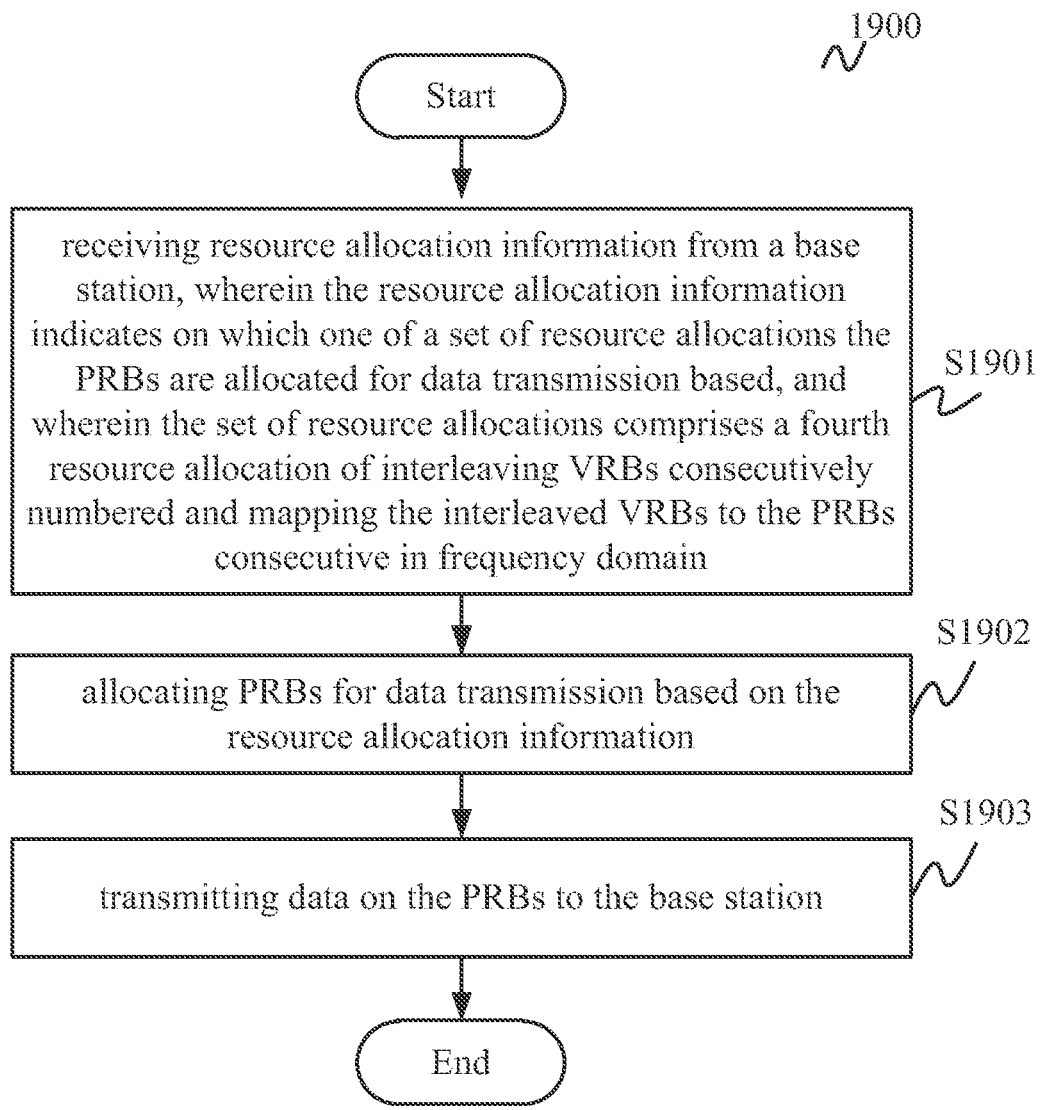
FIG. 19 illustrates a flowchart of a wireless communication method for a user equipment according to another embodiment of the present disclosure.

In a further embodiment of the present disclosure, there is provided a wireless communication method for a user equipment as shown in FIG. 19. FIG. 19 illustrates a flowchart of a wireless communication method 1900 for a user equipment according to another embodiment of the present disclosure. For example, the wireless communication method 1900 may be applied to the UE 1500 as shown in FIG. 15.

As shown in FIG. 19, the wireless communication method 1900 starts at a step S1901 in which resource allocation information is received from a base station, wherein the resource allocation information indicates on which one of a set of resource allocations Physical Resource Blocks (PRBs) are allocated for data transmission based, and wherein the set of resource allocations comprises a fourth resource allocation of interleaving Virtual Resource Blocks (VRBs) consecutively numbered and mapping the interleaved VRBs to the PRBs consecutive in frequency domain. After the step S1903, the wireless communication method 1900 is ended. Then, at a step S1902, PRBs are allocated for data transmission based on the resource allocation information. Subsequently, at a step S1903, data is transmitted on the PRBs to the base station. For example, the base station may be BS 1700 as shown in FIG. 17.

Note that, the other technical features and advantages in the user equipment 1500 as described above can also be incorporated in the wireless communication method 1900 and will not be described here for avoiding redundancy.

Figure 20:
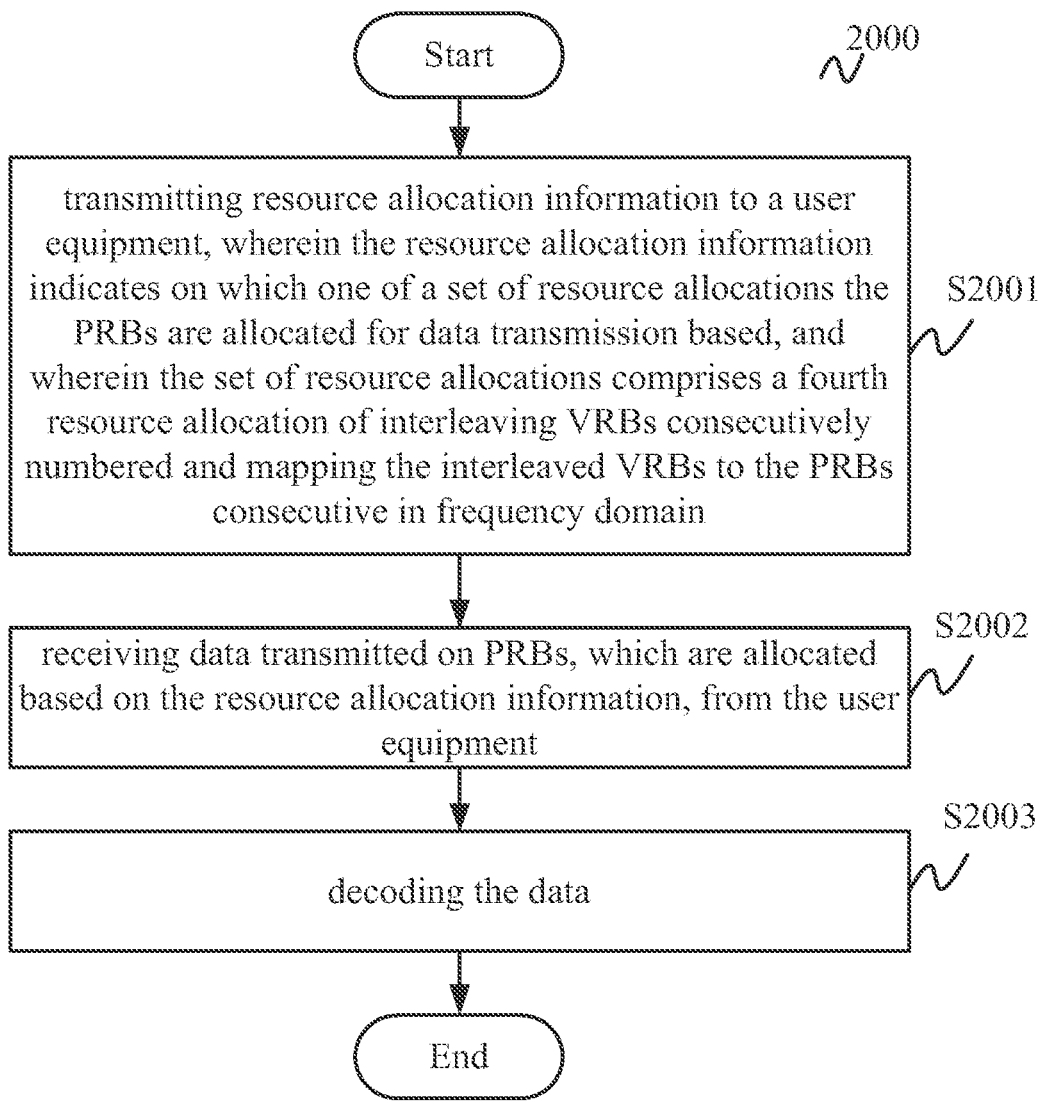
FIG. 20 illustrates a flowchart of a wireless communication method for a base station according to another embodiment of the present disclosure.

In a further embodiment of the present disclosure, there is provided a wireless communication method for a base station as shown in FIG. 20. FIG. 20 illustrates a flowchart of a wireless communication method 2000 for a base station according to another embodiment of the present disclosure. For example, the wireless communication method 2000 may be applied to the BS 1700 as shown in FIG. 17.

As shown in FIG. 20, the wireless communication method 2000 starts at a step S2001 in which, resource allocation information is transmitted to a user equipment, wherein the resource allocation information indicates on which one of a set of resource allocations Physical Resource Blocks (PRBs) are allocated for data transmission based, and wherein the set of resource allocations comprises a fourth resource allocation of interleaving Virtual Resource Blocks (VRBs) consecutively numbered and mapping the interleaved VRBs to the PRBs consecutive in frequency domain. Then, at a step 2002, data transmitted on PRBs, which are allocated based on the resource allocation information, is received from the user equipment. Subsequently, at a step S2003, the data is decoded. After the step S2003, the wireless communication method 2000 is ended. For example, the user equipment may be the UE 1500 as shown in FIG. 15.

Note that, the other technical features and advantages in the BS 1700 as described above can also be incorporated in the wireless communication method 2000 and will not be described here for avoiding redundancy.

Although only downlink and uplink communications between a base station and a user equipment are described above, the present disclosure is not limited thereto and may also be applied to sidelink communication between two UEs (that is, a D2D case). Specifically, in a D2D case, a UE may decide to use which one of the above resource allocation types for data transmission between two UEs on its own without any RA indication from a base station. For each NR RA type, the VRB interleaving and mapping from VRBs to PRBs as well as the design of the block interleaver are the same as those described above for DL and UL cases. That is to say, in a D2D case, a UE may operate like the BS 200 as shown in FIG. 2 and may perform the wireless communication method 1500 as shown in FIG. 15.

The present disclosure can be realized by software, hardware, or software in cooperation with hardware. Each functional block used in the description of each embodiment described above can be realized by an LSI as an integrated circuit, and each process described in the each embodiment may be controlled by LSI. They may be individually formed as chips, or one chip may be formed so as to include a part or all of the functional blocks. They may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit or a general-purpose processor. In addition, a FPGA (Field Programmable Gate Array) that can be programmed after the manufacture of the LSI or a reconfigurable processor in which the connections and the settings of circuits cells disposed inside the LSI can be reconfigured may be used.

It is noted that the present disclosure intends to be variously changed or modified by those skilled in the art based on the description presented in the specification and known technologies without departing from the content and the scope of the present disclosure, and such changes and applications fall within the scope that claimed to be protected. Furthermore, in a range not departing from the content of the disclosure, the constituent elements of the above-described embodiments may be arbitrarily combined.

Embodiments of the present disclosure can at least provide the following subject matters.

(1). A base station, comprising:
circuitry operative to allocate Physical Resource Blocks (PRBs) for data transmission based on one of a set of resource allocations; and
a transmitter operative to transmit data on the PRBs to a user equipment,
wherein the set of resource allocations comprises:
a first resource allocation of interleaving Virtual Resource Blocks (VRBs) consecutively numbered and mapping the interleaved VRBs to the PRBs consecutive in frequency domain.

(2). The base station according to (1), wherein the set of resource allocations further comprises: a second resource allocation of interleaving VRBs consecutively numbered and mapping the interleaved VRBs to the PRBs the positions of which in frequency domain are indicated by a bitmap.

(3). The base station according to (2), wherein the set of resource allocations further comprises: a third resource allocation of interleaving VRBs consecutively numbered and mapping the interleaved VRBs to the PRBs inconsecutive in frequency domain within a specified or configured frequency range.

(4). The base station according to (3), wherein the first allocation and the second allocation perform interleaving based on a subset of a block interleaver on which the third allocation performs interleaving based, the block interleaver being based on a block interleaver used in LTE or otherwise configured depending on configured Resource Block Group (RBG) size.

(5). The base station according to (4), wherein the block interleaver writes VRB numbers row by row and reads them out column by column, and
wherein the number of rows $N_{row}$ of the subset of the block interleaver is determined by $N_{row}=\lceil \tilde{N}_{VRB\_allocated}^{DL}/N_{column}\rceil$ where $\tilde{N}_{VRB\_allocated}^{DL}$ indicates the number of allocated VRBs and $N_{column}$ is the number of columns of the block interleaver, and
wherein the number of columns $N_{column}$ of the block interleaver is specified or configured.

(6). The base station according to (3), wherein the specified or configured frequency range is equal to or smaller than the entire carrier bandwidth or bandwidth part.

(7). The base station according to (3), wherein after interleaving, the third allocation further introduces a frequency gap on slot basis for each VRB.

(8). The base station according to (3), wherein the first allocation corresponds to RA type 1 with localized allocation for downlink in NR, the second allocation corresponds to RA type 0 for downlink in NR, and the third allocation corresponds to RA type 1 with distributed allocation for downlink in NR.

(9). A user equipment, comprising:
a receiver operative to receive data transmitted on Physical Resource Blocks (PRBs) and resource allocation information from a base station; and
circuitry operative to decode the data based on the resource allocation information,
wherein the resource allocation information indicates on which one of a set of resource allocations the PRBs are allocated for data transmission based, and
wherein the set of resource allocations comprises:
a first resource allocation of interleaving Virtual Resource Blocks (VRBs) consecutively numbered and mapping the interleaved VRBs to the PRBs consecutive in frequency domain.

(10). The user equipment according to (9), wherein the set of resource allocations further comprises: a second resource allocation of interleaving VRBs consecutively numbered and mapping the interleaved VRBs to the PRBs the positions of which in frequency domain are indicated by a bitmap.

(11). The user equipment according to (10), wherein the set of resource allocations further comprises: a third resource allocation of interleaving VRBs consecutively numbered and mapping the interleaved VRBs to the PRBs inconsecutive in frequency domain within a predetermined frequency range.

(12). The user equipment according to (11), wherein the first allocation and the second allocation perform interleaving based on a subset of a block interleaver on which the third allocation performs interleaving based, the block interleaver being based on a block interleaver used in LTE or otherwise configured depending on configured Resource Block Group (RBG) size.

(13). The user equipment according to (12), wherein the block interleaver writes VRB numbers row by row and reads them out column by column, and
wherein the number of rows $N_{row}$ of the subset of the block interleaver is determined by $N_{row}=\lceil \tilde{N}_{VRB\_allocated}^{DL}/N_{column}\rceil$ where $\tilde{N}_{VRB\_allocated}^{DL}$ indicates the number of allocated VRBs and $N_{column}$ is the number of columns of the block interleaver, and
wherein the number of columns $N_{column}$ of the block interleaver is specified or configured.

(14). The user equipment according to (11), wherein the specified or configured frequency range is equal to or smaller than the entire carrier bandwidth or bandwidth part.

(15). The user equipment according to (11), wherein after interleaving, the third allocation further introduces a frequency gap on slot basis for each VRB.

(16). The user equipment according to (11), wherein the first allocation corresponds to RA type 1 with localized allocation for downlink in NR, the second allocation corresponds to RA type 0 for downlink in NR, and the third allocation corresponds to RA type 1 with distributed allocation for downlink in NR.

(17). A wireless communication method for a base station, comprising:
allocating Physical Resource Blocks (PRBs) for data transmission based on one of a set of resource allocations; and
transmitting data on the PRBs to a user equipment,
wherein the set of resource allocations comprises:
a first resource allocation of interleaving Virtual Resource Blocks (VRBs) consecutively numbered and mapping the interleaved VRBs to the PRBs consecutive in frequency domain.

(18). The wireless communication method according to (17), wherein the set of resource allocations further comprises: a second resource allocation of interleaving VRBs consecutively numbered and mapping the interleaved VRBs to the PRBs the positions of which in frequency domain are indicated by a bitmap.

(19). The wireless communication method according to (18), wherein the set of resource allocations further comprises: a third resource allocation of interleaving VRBs consecutively numbered and mapping the interleaved VRBs to the PRBs inconsecutive in frequency domain within a specified or configured frequency range.

(20). The wireless communication method according to (19), wherein the first allocation and the second allocation perform interleaving based on a subset of a block interleaver on which the third allocation performs interleaving based, the block interleaver being based on a block interleaver used in LTE or otherwise configured depending on configured Resource Block Group (RBG) size.

(21). The wireless communication method according to (20), wherein the block interleaver writes VRB numbers row by row and reads them out column by column, and
wherein the number of rows $N_{row}$ of the subset of the block interleaver is determined by $N_{row}=\lceil \tilde{N}_{VRB\_allocated}^{DL}/N_{column}\rceil$ where $\tilde{N}_{VRB\_allocated}^{DL}$ indicates the number of allocated VRBs and $N_{column}$ is the number of columns of the block interleaver, and
wherein the number of columns $N_{column}$ of the block interleaver is specified or configured.

(22). The wireless communication method according to (19), wherein the specified or configured frequency range is equal to or smaller than the entire carrier bandwidth or bandwidth part.

(23). The wireless communication method according to (19), wherein after interleaving, the third allocation further introduces a frequency gap on slot basis for each VRB.

(24). The wireless communication method according to (19), wherein the first allocation corresponds to RA type 1 with localized allocation for downlink in NR, the second allocation corresponds to RA type 0 for downlink in NR, and the third allocation corresponds to RA type 1 with distributed allocation for downlink in NR.

(25). A wireless communication method for user equipment, comprising:

receiving data transmitted on Physical Resource Blocks (PRBs) and resource allocation information from a base station; and decoding the data based on the resource allocation information, wherein the resource allocation information indicates on which one of a set of resource allocations the PRBs are allocated for data transmission based, and wherein the set of resource allocations comprises:
a first resource allocation of interleaving Virtual Resource Blocks (VRBs) consecutively numbered and mapping the interleaved VRBs to the PRBs consecutive in frequency domain.

(26). The wireless communication method according to (25), wherein the set of resource allocations further comprises: a second resource allocation of interleaving VRBs consecutively numbered and mapping the interleaved VRBs to the PRBs the positions of which in frequency domain are indicated by a bitmap.

(27). The wireless communication method according to (26), wherein the set of resource allocations further comprises: a third resource allocation of interleaving VRBs consecutively numbered and mapping the interleaved VRBs to the PRBs inconsecutive in frequency domain within a predetermined frequency range.

(28). The wireless communication method according to (27), wherein the first allocation and the second allocation perform interleaving based on a subset of a block interleaver on which the third allocation performs interleaving based, the block interleaver being based on a block interleaver used in LTE or otherwise configured depending on configured Resource Block Group (RBG) size.

(29). The wireless communication method according to (28), wherein the block interleaver writes VRB numbers row by row and reads them out column by column, and wherein the number of rows $N_{row}$ of the subset of the block interleaver is determined by $N_{row} = \lceil \tilde{N}_{VRB\_allocated}^{DL} / N_{column} \rceil$ where $\tilde{N}_{VRB\_allocated}^{DL}$ indicates the number of allocated VRBs and $N_{column}$ is the number of columns of the block interleaver, and wherein the number of columns $N_{column}$ of the block interleaver is specified or configured.

(30). The wireless communication method according to (27), wherein the specified or configured frequency range is equal to or smaller than the entire carrier bandwidth or bandwidth part.

(31). The wireless communication method according to (27), wherein after interleaving, the third allocation further introduces a frequency gap on slot basis for each VRB.

(32). The wireless communication method according to (27), wherein the first allocation corresponds to RA type 1 with localized allocation for downlink in NR, the second allocation corresponds to RA type 0 for downlink in NR, and the third allocation corresponds to RA type 1 with distributed allocation for downlink in NR.

(33). A user equipment, comprising:

a receiver operative to receive resource allocation information from a base station;

circuitry operative to allocate Physical Resource Blocks (PRBs) for data transmission based on the resource allocation information; and a transmitter operative to transmit data on the PRBs to the base station, wherein the resource allocation information indicates on which one of a set of resource allocations the PRBs are allocated for data transmission based, and wherein the set of resource allocations comprises:
a fourth resource allocation of interleaving Virtual Resource Blocks (VRBs) consecutively numbered and mapping the interleaved VRBs to the PRBs consecutive in frequency domain.

(34). The user equipment according to (33), wherein the set of resource allocations further comprises: a fifth resource allocation of interleaving VRBs consecutively numbered and mapping the interleaved VRBs to the PRBs the positions of which in frequency domain are indicated by a bitmap.

(35). The user equipment according to (34), wherein the fourth allocation and the fifth allocation perform interleaving based on a subset of a block interleaver which is based on a block interleaver used in LTE or otherwise configured depending on configured Resource Block Group (RBG) size.

(36). The user equipment according to (35), wherein the block interleaver writes VRB numbers row by row and reads them out column by column, and wherein the number of rows $N_{row}$ of the subset of the block interleaver is determined by $N_{row} = \lceil \tilde{N}_{VRB\_allocated}^{DL} / N_{column} \rceil$ where $\tilde{N}_{VRB\_allocated}$ indicates the number of allocated VRBs and $N_{column}$ is the number of columns of the block interleaver, and wherein the number of columns $N_{column}$ of the block interleaver is specified or configured.

(37). The user equipment according to (34), wherein after interleaving, the fourth allocation and/or the fifth further introduces a frequency hopping between two slots or within a slot for each VRB.

(38). The user equipment according to (34), wherein the fourth allocation corresponds to RA type 1 with localized allocation for uplink in NR, and the fifth allocation corresponds to RA type 0 for uplink in NR.

(39). A base station, comprising:

a transmitter operative to transmit resource allocation information to a user equipment;

a receiver operative to receive data transmitted on Physical Resource Blocks (PRBs), which are allocated based on the resource allocation information, from the user equipment; and circuitry operative to decode the data, wherein the resource allocation information indicates on which one of a set of resource allocations the PRBs are allocated for data transmission based, and wherein the set of resource allocations comprises:
a fourth resource allocation of interleaving Virtual Resource Blocks (VRBs) consecutively numbered and mapping the interleaved VRBs to the PRBs consecutive in frequency domain.

(40). The base station according to (39), wherein the set of resource allocations further comprises: a fifth resource allocation of interleaving VRBs consecutively numbered and mapping the interleaved VRBs to the PRBs the positions of which in frequency domain are indicated by a bitmap.

(41). The base station according to (40), wherein the fourth allocation and the fifth allocation perform interleaving based on a subset of a block interleaver which is based on a block interleaver used in LTE or otherwise configured depending on configured Resource Block Group (RBG) size.

(42). The base station according to (41), wherein the block interleaver writes VRB numbers row by row and reads them out column by column, and
wherein the number of rows $N_{row}$ of the subset of the block interleaver is determined by $N_{row} = \lceil \tilde{N}_{VRB\_allocated}^{DL} / N_{column} \rceil$ where $\tilde{N}_{VRB\_allocated}$ indicates the number of allocated VRBs and $N_{column}$ is the number of columns of the block interleaver, and
wherein the number of columns $N_{column}$ of the block interleaver is specified or configured.

(43). The base station according to (40), wherein after interleaving, the fourth allocation and/or the fifth further introduces a frequency hopping between two slots or within a slot for each VRB.

(44). The base station according to (40), wherein the fourth allocation corresponds to RA type 1 with localized allocation for uplink in NR, and the fifth allocation corresponds to RA type 0 for uplink in NR.

(45). A wireless communication method for a user equipment, comprising:
receiving resource allocation information from a base station;
allocating Physical Resource Blocks (PRBs) for data transmission based on the resource allocation information; and
transmitting data on the PRBs to the base station,
wherein the resource allocation information indicates on which one of a set of resource allocations the PRBs are allocated for data transmission based, and
wherein the set of resource allocations comprises:
a fourth resource allocation of interleaving Virtual Resource Blocks (VRBs) consecutively numbered and mapping the interleaved VRBs to the PRBs consecutive in frequency domain.

(46). The wireless communication method according to (45), wherein the set of resource allocations further comprises: a fifth resource allocation of interleaving VRBs consecutively numbered and mapping the interleaved VRBs to the PRBs the positions of which in frequency domain are indicated by a bitmap.

(47). The wireless communication method according to (46), wherein the fourth allocation and the fifth allocation perform interleaving based on a subset of a block interleaver which is based on a block interleaver used in LTE or otherwise configured depending on configured Resource Block Group (RBG) size.

(48). The wireless communication method according to (47), wherein the block interleaver writes VRB numbers row by row and reads them out column by column, and
wherein the number of rows $N_{row}$ of the subset of the block interleaver is determined by $N_{row} = \lceil \tilde{N}_{VRB\_allocated}^{DL} / N_{column} \rceil$ where $\tilde{N}_{VRB\_allocated}$ indicates the number of allocated VRBs and $N_{column}$ is the number of columns of the block interleaver, and
wherein the number of columns $N_{column}$ of the block interleaver is specified or configured.

(49). The wireless communication method according to (46), wherein after interleaving, the fourth allocation and/or the fifth further introduces a frequency hopping between two slots or within a slot for each VRB.

(50). The wireless communication method according to (46), wherein the fourth allocation corresponds to RA type 1 with localized allocation for uplink in NR, and the fifth allocation corresponds to RA type 0 for uplink in NR.

(51). A wireless communication method for a base station, comprising:
transmitting resource allocation information to a user equipment;
receiving data transmitted on Physical Resource Blocks (PRBs), which are allocated based on the resource allocation information, from the user equipment; and
decoding the data,
wherein the resource allocation information indicates on which one of a set of resource allocations the PRBs are allocated for data transmission based, and
wherein the set of resource allocations comprises:
a fourth resource allocation of interleaving Virtual Resource Blocks (VRBs) consecutively numbered and mapping the interleaved VRBs to the PRBs consecutive in frequency domain.

(52). The wireless communication method according to (51), wherein the set of resource allocations further comprises: a fifth resource allocation of interleaving VRBs consecutively numbered and mapping the interleaved VRBs to the PRBs the positions of which in frequency domain are indicated by a bitmap.

(53). The wireless communication method according to (52), wherein the fourth allocation and the fifth allocation perform interleaving based on a subset of a block interleaver which is based on a block interleaver used in LTE or otherwise configured depending on configured Resource Block Group (RBG) size.

(54). The wireless communication method according to (53), wherein the block interleaver writes VRB numbers row by row and reads them out column by column, and
wherein the number of rows $N_{row}$ of the subset of the block interleaver is determined by $N_{row} = \lceil \tilde{N}_{VRB\_allocated}^{DL} / N_{column} \rceil$ where $\tilde{N}_{VRB\_allocated}$ indicates the number of allocated VRBs and $N_{column}$ is the number of columns of the block interleaver, and
wherein the number of columns $N_{column}$ of the block interleaver is specified or configured.

(55). The wireless communication method according to (52), wherein after interleaving, the fourth allocation and/or the fifth further introduces a frequency hopping between two slots or within a slot for each VRB.

(56). The wireless communication method according to (52), wherein the fourth allocation corresponds to RA type 1 with localized allocation for uplink in NR, and the fifth allocation corresponds to RA type 0 for uplink in NR.

The invention claimed is:
1. A base station, comprising:
circuitry operative to allocate Physical Resource Blocks (PRBs) for data transmission based on one of a set of resource allocations; and a transmitter operative to transmit data on the PRBs to a user equipment, wherein the set of resource allocations comprises:
- a first resource allocation of interleaving Virtual Resource Blocks (VRBs) consecutively numbered, and mapping the interleaved VRBs for the first resource allocation to consecutive PRBs in a frequency domain,
- a second resource allocation of interleaving VRBs consecutively numbered, and mapping the interleaved VRBs for the second resource allocation to PRBs according to a bitmap,
- a third resource allocation of interleaving VRBs consecutively numbered, and mapping the interleaved VRBs for the third resource allocation to inconsecutive PRBs in the frequency domain, and wherein each of the first resource allocation and the second resource allocation interleaves a subset of VRBs in a block interleaver, and the third resource allocation interleaves all of the VRBs in the block interleaver.

2. The base station according to claim 1, wherein the inconsecutive PRBs are within a specified or configured frequency range.

3. The base station according to claim 2, wherein the specified or configured frequency range is equal to or smaller than an entire carrier bandwidth or a bandwidth part.

4. The base station according to claim 1, wherein the block interleaver is based on a block interleaver used in Long Term Evolution (LTE) or otherwise configured depending on configured Resource Block Group (RBG) size.

5. The base station according to claim 3, wherein the block interleaver writes VRB numbers row by row and reads them out column by column, and
wherein the number of rows $N_{row}$ of the subset of VRBs in the block interleaver is determined by $N_{row} = \lceil \tilde{N}_{VRB\_allocated}^{DL} / N_{column} \rceil$ where $\tilde{N}_{VRB\_allocated}^{DL}$ indicates the number of allocated VRBs and $N_{column}$ is the number of columns of the block interleaver, and
wherein the number of columns $N_{column}$ of the block interleaver is specified or configured.

6. The base station according to claim 1 wherein
each of the interleaved VRBs for the third resource allocation is split into first and second parts in a time domain, and
the first and second parts are mapped to first and second PRBs, respectively, that are spaced from each other in the frequency domain.

7. A user equipment, comprising:
a receiver operative to receive data transmitted on Physical Resource Blocks (PRBs) and resource allocation information from a base station; and
circuitry operative to decode the data based on the resource allocation information,
wherein the resource allocation information indicates on which one of a set of resource allocations, allocation of the PRBs for data transmission is based on, and
wherein the set of resource allocations comprises:
- a first resource allocation of interleaving Virtual Resource Blocks (VRBs) consecutively numbered, and mapping the interleaved VRBs for the first resource allocation to consecutive PRBs in a frequency domain,
- a second resource allocation of interleaving VRBs consecutively numbered, and mapping the interleaved VRBs for the second resource allocation to PRBs according to a bitmap,
- a third resource allocation of interleaving VRBs consecutively numbered, and mapping the interleaved VRBs for the third resource allocation to inconsecutive PRBs in the frequency domain, and wherein each of the first resource allocation and the second resource allocation interleaves a subset of VRBs in a block interleaver, and the third resource allocation interleaves all of the VRBs in the block interleaver.

8. The user equipment according to claim 7, wherein the inconsecutive PRBs are within a predetermined frequency range.

9. A user equipment, comprising:
a receiver operative to receive resource allocation information from a base station;
circuitry operative to allocate Physical Resource Blocks (PRBs) for data transmission based on the resource allocation information; and
a transmitter operative to transmit data on the PRBs to the base station,
wherein the resource allocation information indicates on which one of a set of resource allocations, allocation of the PRBs for data transmission is based on, and
wherein the set of resource allocations comprises:
- a first resource allocation of interleaving Virtual Resource Blocks (VRBs) consecutively numbered, and mapping the interleaved VRBs for the first resource allocation to consecutive PRBs in a frequency domain,
- a second resource allocation of interleaving VRBs consecutively numbered, and mapping the interleaved VRBs for the second resource allocation to PRBs according to a bitmap,
- a third resource allocation of interleaving VRBs consecutively numbered, and mapping the interleaved VRBs for the third resource allocation to inconsecutive PRBs in the frequency domain, and wherein each of the first resource allocation and the second resource allocation interleaves a subset of VRBs in a block interleaver, and the third resource allocation interleaves all of the VRBs in the block interleaver.

10. The user equipment according to claim 9, wherein the block interleaver is based on a block interleaver used in Long Term Evolution (LTE) or otherwise configured depending on configured Resource Block Group (RBG) size.

11. The user equipment according to claim 10, wherein the block interleaver writes VRB numbers row by row and reads them out column by column, and
wherein the number of rows $N_{row}$ of the subset of VRBs in the block interleaver is determined by $N_{row} = \lceil \tilde{N}_{VRB\_allocated}^{DL} / N_{column} \rceil$ where $\tilde{N}_{VRB\_allocated}^{DL}$ indicates the number of allocated VRBs and $N_{column}$ is the number of columns of the block interleaver, and
wherein the number of columns $N_{column}$ of the block interleaver is specified or configured.

12. A base station, comprising:
a transmitter operative to transmit resource allocation information to a user equipment;
a receiver operative to receive data transmitted on Physical Resource Blocks (PRBs), which are allocated based on the resource allocation information, from the user equipment; and circuitry operative to decode the data,
wherein the resource allocation information indicates on which one of a set of resource allocations, allocation of the PRBs for data transmission is based on, and
wherein the set of resource allocations comprises:
- a first resource allocation of interleaving Virtual Resource Blocks (VRBs) consecutively numbered, and mapping the interleaved VRBs for the first resource allocation to consecutive PRBs in a frequency domain,
- a second resource allocation of interleaving VRBs consecutively numbered, and mapping the interleaved VRBs for the second resource allocation to PRBs according to a bitmap,
- a third resource allocation of interleaving VRBs consecutively numbered, and mapping the interleaved VRBs for the third resource allocation to inconsecutive PRBs in the frequency domain, and
wherein each of the first resource allocation and the second resource allocation interleaves a subset of VRBs in a block interleaver, and the third resource allocation interleaves all of the VRBs in the block interleaver.

13. The base station according to claim 12, wherein the inconsecutive PRBs are within a specified or configured frequency range.

14. The base station according to claim 12, wherein the block interleaver is based on a block interleaver used in LTE or otherwise configured depending on configured Resource Block Group (RBG) size.

* * * * *